(12) United States Patent
Koyama et al.

(10) Patent No.: US 7,167,436 B2
(45) Date of Patent: Jan. 23, 2007

(54) OPTICAL RECORDING MEDIUM HAVING SERVO AREA AND GROOVE SECTION

(75) Inventors: Osamu Koyama, Tokyo (JP); Koichiro Nishikawa, Gunma (JP); Eiji Ueda, Kyoto (JP); Yasumori Hino, Nara (JP)

(73) Assignees: Canon Kabushiki Kaisha, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 719 days.

(21) Appl. No.: 10/437,180

(22) Filed: May 14, 2003

(65) Prior Publication Data
US 2003/0214901 A1   Nov. 20, 2003

(30) Foreign Application Priority Data
May 20, 2002   (JP) .............................. 2002-145133

(51) Int. Cl.
*G11B 7/24*   (2006.01)
*G11B 7/007*   (2006.01)
(52) U.S. Cl. .............................. 369/275.3; 369/275.4; 369/47.22
(58) Field of Classification Search ............ None
See application file for complete search history.

(56) References Cited

U.S. PATENT DOCUMENTS

| | | | |
|---|---|---|---|
| 5,063,546 A | | 11/1991 | Ito et al. |
| 5,134,601 A | * | 7/1992 | Greenwell et al. ........ 369/44.26 |
| 5,214,629 A | * | 5/1993 | Watanabe et al. ......... 369/44.26 |
| 5,434,841 A | | 7/1995 | Nishikawa |
| 5,504,734 A | * | 4/1996 | Morita ...................... 369/275.4 |
| 5,878,007 A | * | 3/1999 | Matsumoto et al. ....... 369/44.34 |
| 6,027,825 A | | 2/2000 | Shiratori et al. |
| 6,147,939 A | | 11/2000 | Takahashi et al. |
| 6,275,455 B1 | * | 8/2001 | Belser ....................... 369/44.26 |
| 6,438,098 B1 | * | 8/2002 | Nakajima et al. ......... 369/275.4 |
| 6,500,598 B1 | * | 12/2002 | Ichihara .................. 430/270.13 |
| 6,791,917 B1 | * | 9/2004 | Hayashi .................... 369/44.34 |
| 7,050,386 B1 | * | 5/2006 | Ueda ........................ 369/275.4 |
| 2003/0095489 A1 | * | 5/2003 | Kobayashi et al. ....... 369/59.25 |

FOREIGN PATENT DOCUMENTS

| | | |
|---|---|---|
| JP | 63-225924 | 9/1988 |
| JP | 06-290496 | 10/1994 |
| JP | 07-114775 | 5/1995 |
| JP | 11-134730 | 5/1999 |
| WO | WO 00/45382 | 8/2000 |
| WO | 01/99103 | 12/2001 |
| WO | 02/23543 | 3/2002 |

* cited by examiner

*Primary Examiner*—Andrea Wellington
*Assistant Examiner*—M. V. Battaglia
(74) *Attorney, Agent, or Firm*—Fitzpatrick, Cella, Harper & Scinto

(57) ABSTRACT

The present invention provides an optical recording medium capable of detecting groove start signals and groove end signals with an inexpensive detection circuit and allowing quick, stable clock detection and tracking pull-in, which optical recording medium is constructed in such a way that the depth $D_G$ of the grooves satisfies $D_G/(\lambda/N)<0.16$, where $\lambda$ is a wavelength of a light beam and N is an index of refraction of a substrate, and that the distance $L_s$ between the groove edge and the pit closest thereto satisfies $L_s>1.2$ FWHM, where FWHM is a full width at half maximum of the light beam in the track direction.

14 Claims, 21 Drawing Sheets

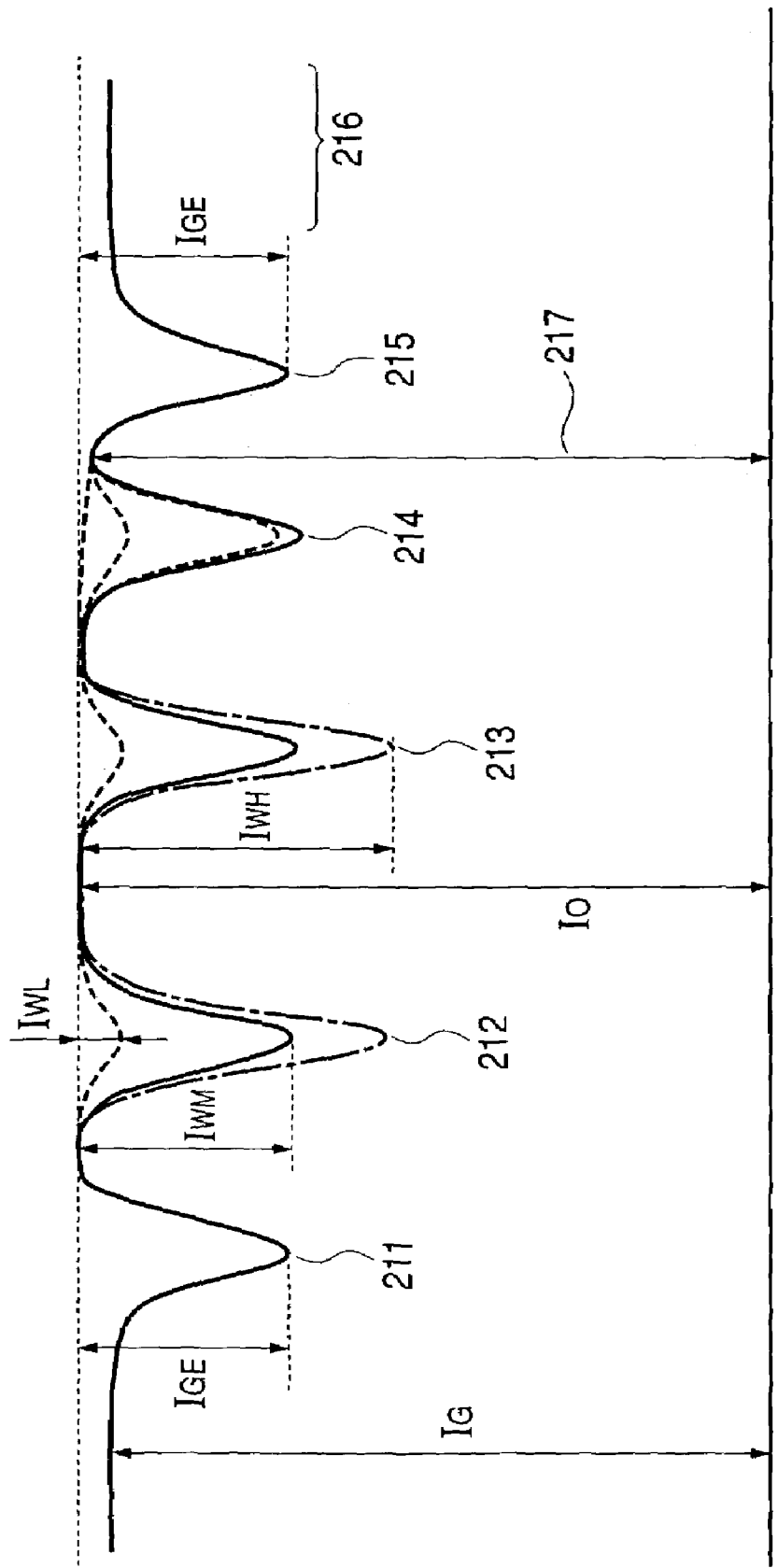

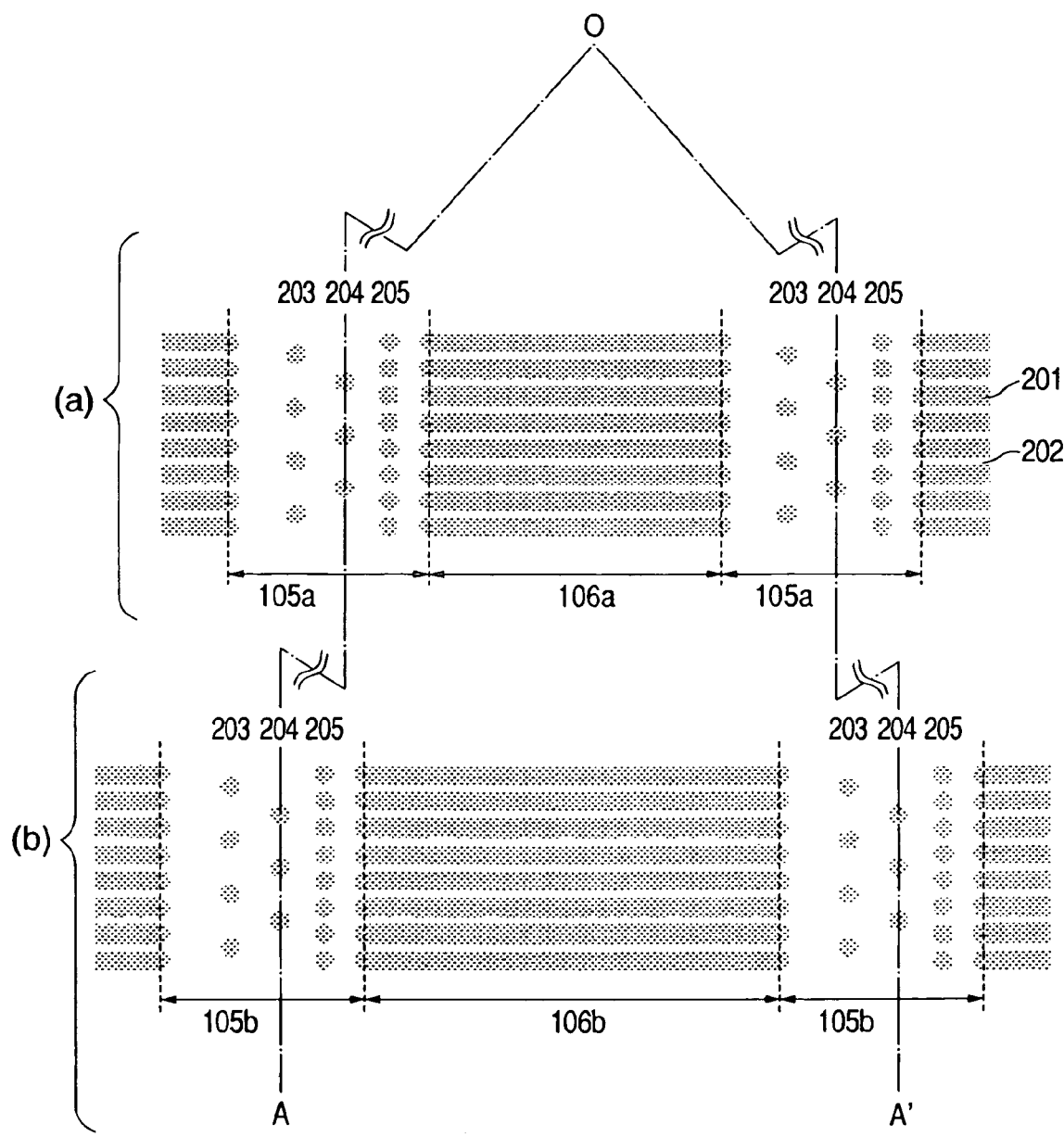

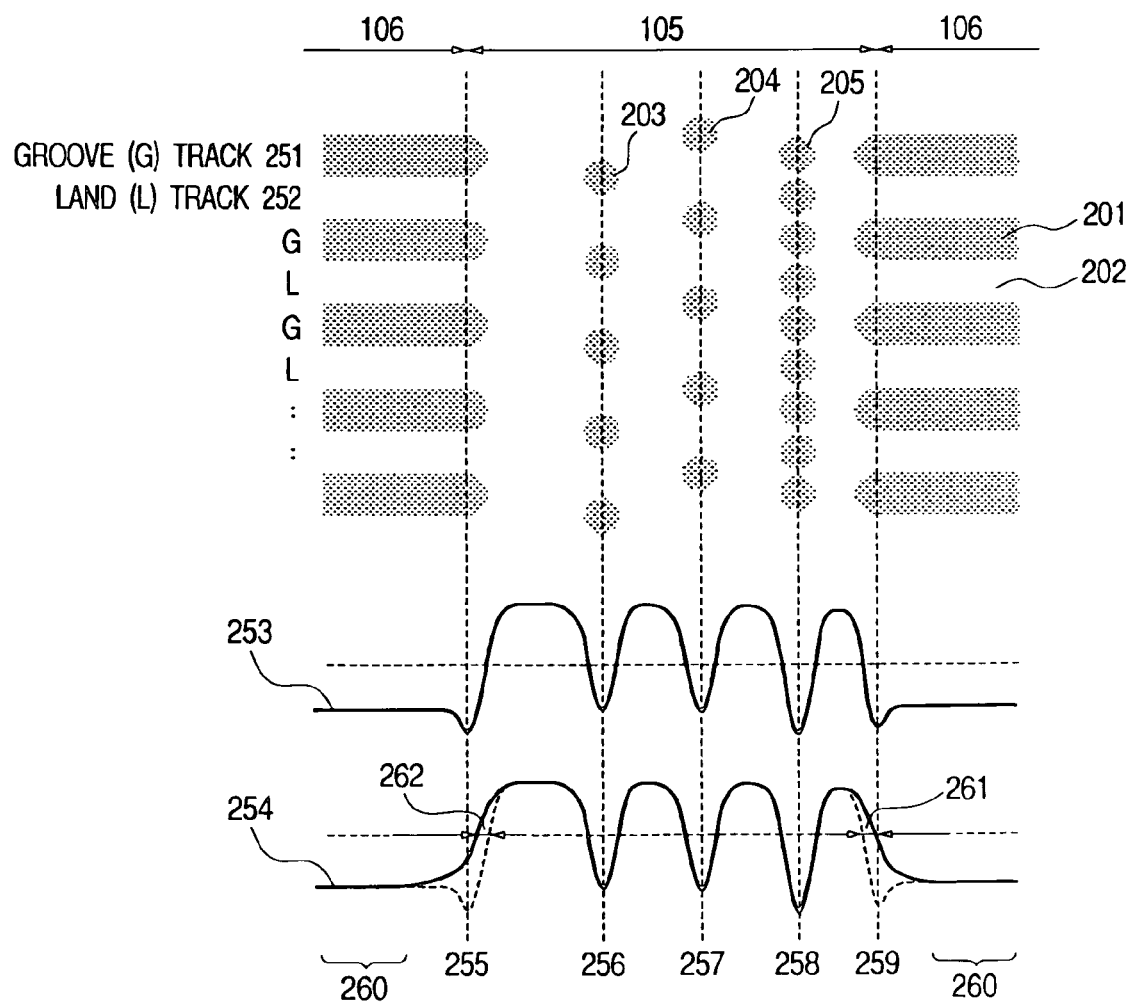

OPTICAL RECORDING MEDIUM HAVING SERVO AREA AND GROOVE SECTION

BACKGROUND OF THE INVENTION

1. Field of the Invention

The present invention relates to an optical recording medium for optically recording and reproducing information, more particularly an optical recording medium according to a sampled servo system.

2. Related Background Art

An optical recording medium has been developed for recording and reproducing information by irradiating a light beam using a so-called sampled servo system, in which patterns consisting of clock pits arranged in the center of concentric or spiral tracks and the first and second wobble pits distributed on the right and left of the center of the tracks, respectively, are formed discretely in the track direction.

FIG. 18 shows an example of an optical recording medium according to a sampled servo system. A clock pit gives clock synchronization information and a pair of wobble pits gives tracking information to a drive apparatus, and there is also a case where one of the pair of wobble pits also functions as the clock pit. A servo area 105 in which these pits are recorded is arranged cyclically for each track. Reference numeral 106 denotes a data area. For an optical recording medium employing a sampled servo system, the servo areas are generally formed in such a way as to be located at the same positions between neighboring tracks, that is, the servo areas are formed radially from the rotation center O of the optical recording medium. According to such a sampled servo system, pits are formed radially from the rotation center O, and therefore it is possible to detect clock pits, generate servo clocks synchronized with the clock pits using a PLL (Phase Locked Loop) circuit and easily detect wobble pits and address pits based on the servo clocks.

FIG. 19 shows details of the servo area in FIG. 18 disclosed by HS-1 Format (Standard ECMA-239). In FIG. 19, tracks for recording data are provided in lands 202 and lands are separated from each other by a groove 201 (land recording). Furthermore, first wobble pits 203 and second wobble pits 204 are distributed equidistantly in the radial direction from the center of each track and arranged in pairs alternately track by track. Furthermore, the first wobble pits 203 also function as clock pits. Reference numeral 241 denotes segment marks that provide information for distinguishing the types of segments and have several types of lengths.

An output waveform when a light beam scans a track is shown in FIG. 19 in association with the positions of the respective pits. An output waveform when a light beam scans a land track is shown as a sum signal 242. When the light beam moves from a data area 106 to a servo area 105, a small level difference is produced and this is called a "groove end signal" 243. When scanning continues, a segment mark signal 244, a first wobble signal 245 and a second wobble signal 246 are detected in that order, and when the light beam moves from the servo area to the data area and reenters the groove, a groove start signal 247 appears. Reference numeral 248 denotes a data area signal.

The sampled servo system is characterized in that servo areas 105 and data areas 106 for recording desired data are physically provided independently of one another, whereby the configuration of the drive apparatus can be simplified, or whereby tracking information given by wobble pits do not easily produce tracking offsets even if an objective lens that irradiates the light beam is displaced in the radius direction or a substrate of a recording medium is tilted in the radial direction. On the contrary, the sampled servo system involves a problem that it requires provision of special servo areas 105, which reduces the format efficiency. In the format based on the sampled servo system shown in FIG. 18 and FIG. 19, there are some attempts to improve the efficiency such as wobble pits also serving as clock pits. However, since special segment marks are provided to facilitate detection of servo areas 105, there is still a high-degree of redundancy. Furthermore, the conventional sampled servo system also has a problem that the area of the servo areas 105 increases toward the outer radius of the medium. Especially when super-resolution reproduction such as a Domain Wall Displacement Detection (DWDD) system, which is disclosed in Japanese Patent Application Laid-Open No. 6-290496, is used for data recording and reproduction, an increase in the proportion of servo areas of showing no super-resolution effect causes a considerable capacity loss.

In order to solve such defects, a sampled servo system with the lengths of the servo areas 105 fixed as the same regardless of its radius is designed as disclosed in International Patent Application WO 01/99103. As shown in FIG. 20, in an optical recording medium using this sampled servo system, the servo areas 105 are arranged in such a way as to be located in the same position between neighboring tracks, but lines connecting the centers of respective pits in the radial direction are parallel to one another. Reference character O denotes the rotation center of the optical recording medium. Reference numeral 106 denote a data area.

An example of the servo area is shown in detail in FIG. 21. In FIG. 21, tracks for recording data are in grooves 201 and grooves are separated from each other by a land 202 (groove recording). Furthermore, first wobble pits 203 and second wobble pits 204 are distributed equidistantly in the radius direction from the center of tracks and are arranged alternately on an extension of the land 202 in the track direction. Because of the arrangement of these wobble pits, it is possible to obtain tracking signals even if a track pitch (center distance between neighboring grooves) is equal to or less than a resolution limit of the light beam. Furthermore, the second wobble pits 204 also function as clock pits. Reference numeral 205 denotes address pits that provide address information. (a) of FIG. 21 shows a relationship between a servo area 105$a$ and a data area 106$a$ on a track of the inner radius of an optical recording medium. (b) of FIG. 21 shows a relationship between a servo area 105$b$ and a data area 106$b$ of on a track of the outer radius of the optical recording medium. As described above, the length of the servo area 105$a$ is the same as that of the servo area 105$b$. Of course, there is a relationship of 106$b$>106$a$. Then, lines OA and OA' connecting the centers of the second wobble pits 204 that also function as clock pits in the radial direction pass through the rotation center O of the optical recording medium. The lines connecting the centers of other pits (203, 205) are parallel to the line OA (OA'). Using such pit arrangement makes it possible to increase the area of the data area 106 and improve the format efficiency.

However, if a sampled servo system in which servo areas have a fixed length regardless of the position in the radius direction is used, the timing at which pits (203, 205) other than the clock pits in the servo area are scanned by the light beam differs in the radial direction of the medium when the recording medium is rotated at a fixed rotation speed. For that reason, there is a problem that the timing for identifying those pits cannot be known before the radial position is identified at the time of servo pull-in when the drive is started or after a seek.

Furthermore, when an optical recording medium according to the sampled servo system is used to record and reproduce information according to an MCLV (Modified Constant Linear Velocity) system as disclosed in Japanese Patent Application Laid-Open No. 7-114775, it is necessary to change the revolution speed of the optical recording medium during access in order to rapidly access different radius positions on the optical recording medium. In such a case, the PLL frequency for detecting clock pits and wobble pits changes drastically as the revolution speed of a motor changes, thereby resulting in a problem of requiring a complicated, expensive PLL circuit which allows synchronization in a wideband.

Furthermore, the sampled servo system with wobble pits alternately arranged as shown in FIG. 21 has a problem that attempting to use one of the two types of wobble pits as clock pits for a purpose of improving the format efficiency will prevent smooth, stable tracking pull-in. This is because clock pits are not always detected stably and the positions of wobble pits are not identified until tracking pull-in is completed, whereby a tracking signal cannot be generated.

To solve such problems, a sampled servo system disclosed in International Patent Application WO02/23543 is designed, which simply detects the servo areas 105 using signals at the start and end of a groove. FIG. 22 shows an optical recording medium according to a so-called land groove recording system in which both the grooves 201 and lands 202 are provided as recording tracks. Groove tracks 251 and land tracks 252 are arranged alternately. The first wobble pits 203 and second wobble pits 204 are distributed equidistantly in the radius direction from the center of each track and alternately arranged on the boundaries between the groove tracks 251 and land tracks 252. Furthermore, the second wobble pits 204 also function as clock pits. Reference numeral 205 denotes address pits for providing address information.

An output waveform when a light beam scans a track is shown in association with the positions of the respective pits in FIG. 22. The output waveform when a light beam scans a groove track is represented by a sum signal 253 of groove tracks. When the light beam moves from the groove 201 (data area 106) to the servo area 105, a large level difference can be detected. This is called a "groove end signal" 255. When scanning continues, a first wobble signal 256, second wobble signal 257 and address signal 258 are detected in that order, and when the light beam moves from the servo area to the data area and reenters a groove, a groove start signal 259 appears. The waveform of the groove start signal 259 is symmetric to the waveform of the groove end signal 255 and can still detect a large level difference. When this level difference is detected with a predetermined threshold L, it is possible to detect the end of the groove, that is, the servo area 105. Likewise, the output waveform when a land track is scanned is represented by a sum signal 254 sum of land tracks. When the light beam moves from the data area 106 to the servo area 105, it is also possible to detect a large level difference. Reference numeral 260 denotes a data area signal.

Also in the aforementioned sampled servo system in which the lengths of the servo areas are fixed regardless of the positions in the radius direction, when focused on this groove end and start signals, detection of the clock pits 204 and detection of wobble pits and address pits (203, 205) based thereon can be carried out relatively easily. Furthermore, when recording and reproducing of information in the medium can be carried out based on the MCLV system, the distance between the groove end signal and groove start signal is constant even if access is carried out while varying revolution speed, and therefore these pits can be detected relatively easily. Constructing a PLL by using groove start and end signals together can simplify the complicated, expensive PLL circuit capable of wideband synchronization. Furthermore, even when an attempt is made to use one of the two types of wobble pits as clock pits simultaneously to improve the format efficiency, the groove start and end signals can be detected without the need for tracking pull-in, thus realizing rapid and stable tracking pull-in.

Furthermore, in connection with the sampled servo system, when a system as disclosed in HS-1 Format (Standard ECMA-239) in which address information is collectively recorded in a specific segment is applied to an optical recording medium carrying out data recording and reproduction by using super-resolution reproduction such as in the domain wall displacement detection system, there is a problem that the format efficiency is reduced drastically. This is because super-resolution has no effect on address pits and if its recording density differs from that of the data area in a great deal, the proportion that the address segment occupies relatively increases. This is the same problem as that related to the length of the aforementioned servo area.

To solve this problem, a one-bit distributed address format is adopted in which address pits 205 are arranged with one bit distributed in each segment as shown in FIG. 21 and FIG 22. With regard to the distributed address format, the technology disclosed in International Patent Application WO 00/45382 is used.

However, by using the conventional configuration, it is difficult to detect groove start and end signals accurately. For example, for the optical recording medium with land recording in FIG. 19, the level difference detected as groove start and end signals (243, 247) are small and it is difficult to detect this level difference accurately.

Furthermore, for the optical recording medium with land recording in FIG. 22, there is a problem that different waveforms are produced when a light beam scans the groove tracks 251 and when the light beam scans the land tracks. When the light beam moves from a data area to a servo area, a sum signal 253 of groove tracks produces a small downward convex waveform and then increases, whereas a sum signal 254 of land tracks has a monotonously increasing waveform. Waveforms symmetric to these are also obtained when the light beam moves from the servo area to the data area. When the land tracks-sum signal 254 (solid line) is shown with the groove tracks-sum signal 253 (dotted line) superimposed thereon, there is a problem that a groove start signal shift 261 and groove end signal shift 262 are produced when the groove end and start signals (255, 259) are detected using a predetermined threshold L.

On the other hand, for the groove recording medium of FIG. 21, the groove tracks-sum signal is always the same as that shown by reference numeral 253 of FIG. 22, thereby causing no problem of the groove start signal shift and groove end signal shift in the case of the land groove recording. However, there is a problem that detecting groove start and end signals (255, 259) with a predetermined threshold L requires a complicated level detection circuit capable of responding to local variations of reflectance on the medium. Moreover, it is unknown what groove shape can provide easily detectable groove start and end signals (255, 259) in a groove recording medium.

Furthermore, it is also unknown how the first wobble pits 203, second wobble pits 204 and address pits 205 should be arranged to allow the most stable tracking signal detection and address signal detection.

SUMMARY OF THE INVENTION

The present invention provides an optical recording medium with grooves, in which groove start and end signals can be detected with an inexpensive detection circuit to realize quick and stable clock detection and tracking pull-in.

The present invention also provides an optical recording medium, which allows quick and stable clock detection and tracking pull-in according to an MCLV-based recording/reproduction method using wobble pits as clock pits while improving the format efficiency.

Furthermore, the present invention provides a sampled servo system optical recording medium having a pit arrangement allowing most stable tracking signal detection and address signal detection.

The present invention provides an optical recording medium for reproducing information by using a light beam, comprising a disk-shaped transparent substrate, servo areas and data areas formed on the substrate, and pits formed on the servo areas, wherein the servo areas are formed on a flat section of the substrate, the data areas are formed in the grooves of the substrate, the servo areas and data areas are provided alternately in the circumferential direction of the substrate to form information tracks, and the depth $D_G$ of the grooves satisfies the relation of $D_G/(\lambda/N)<0.16$, where $\lambda$ is a wavelength of the light beam and N is an index of refraction of the substrate, and the distance $L_s$ between the groove end and the pit closest thereto satisfies the relation of $L_s>1.2$ FWHM, where FWHM is a full width at half maximum of the light beam in the track direction.

BRIEF DESCRIPTION OF THE DRAWINGS

FIG. 13 is an illustration for a preferred example of a waveform of a reproduction sum signal of the optical recording medium according to the second embodiment of the present invention;

FIG. 21 is an illustration for servo areas of the optical recording medium of FIG. 20 and a signal of its reproduction sum; and FIG. 22 is an illustration for servo areas of the conventional optical recording medium and its reproduction sum signal.

DETAILED DESCRIPTION OF THE PREFERRED EMBODIMENTS

With reference now to the attached drawings, embodiments of the present invention will be explained below.

(Embodiment 1)

Figure 1:
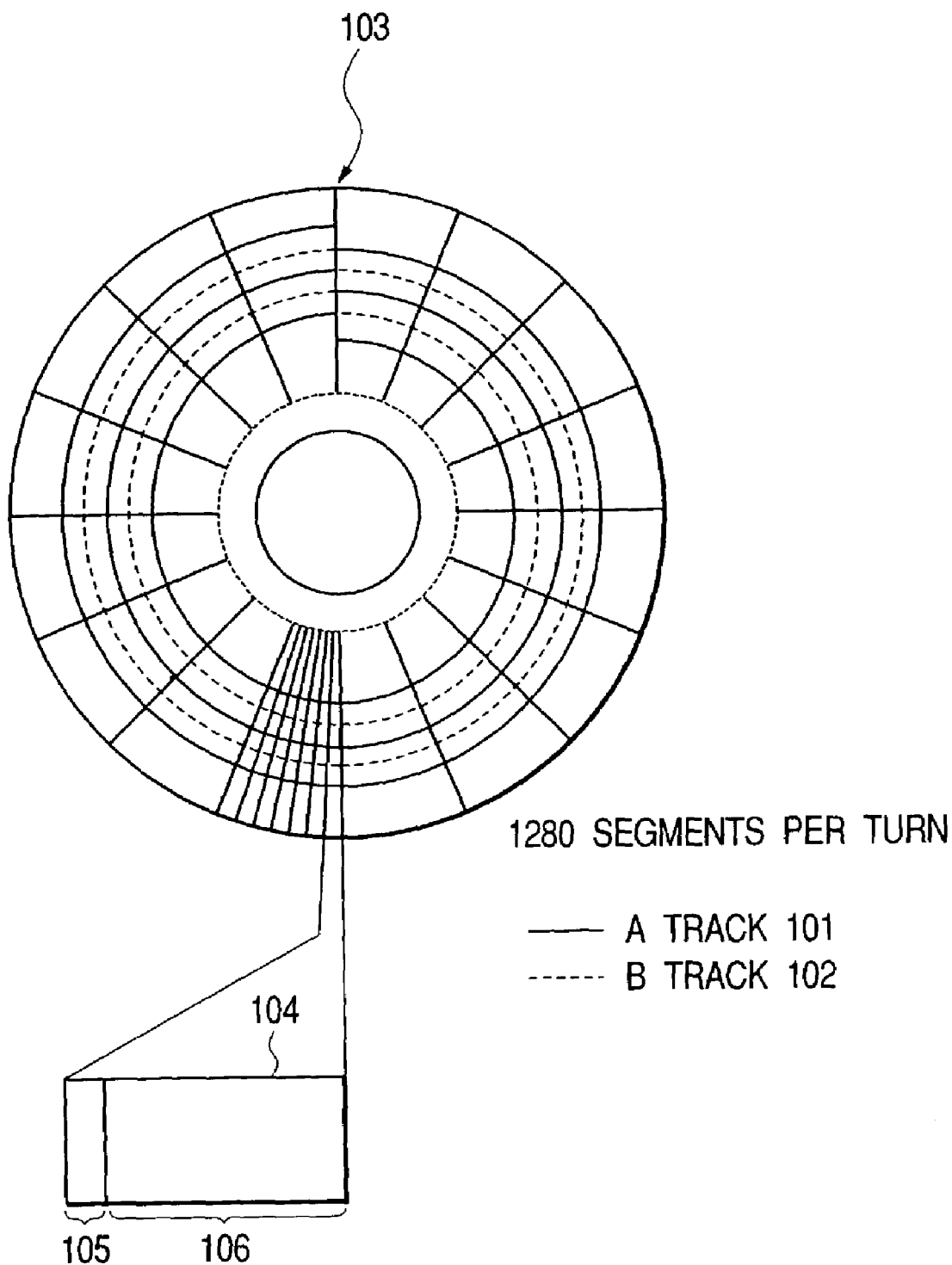
FIG. 1 is a plan view showing a configuration of an optical recording medium according to a first embodiment of the present invention.

FIG. 1 is a plan view showing a transparent substrate of an optical recording medium using a sampled servo according to an embodiment of the present invention. Especially, a track structure of the optical recording medium according to the present invention will be explained in detail. A track consists of track A 101 and track B 102 with mutually different servo polarities and has a spiral structure in which track A and track B alternate every one turn of the medium. Track A and track B are connected at an AB track connection section 103. Furthermore, a track is divided into 1280 segments 104 per one turn of the medium and one segment 104 consists of a servo area 105 having servo pits and a data area 106 for recording desired data.

The servo areas 105 are arranged radially on the optical recording medium as shown in FIG. 1 and the length of each servo area is fixed to approximately 5.5 (μm regardless of the radius position of the medium. This improves the format efficiency compared to a conventional sampled servo. The length of the data area of each segment increases in the direction from the inner radius to the outer radius and the amount of data recordable in one segment 104 increases toward the outer radius. The radial direction is divided into 26 zones, and the amount of data recordable in a data area can be changed from one zone to another. Furthermore, the position of a servo pit does not change within the medium, and therefore it is possible to generate substantially uniform tracking signals over the entire medium.

Figure 2:
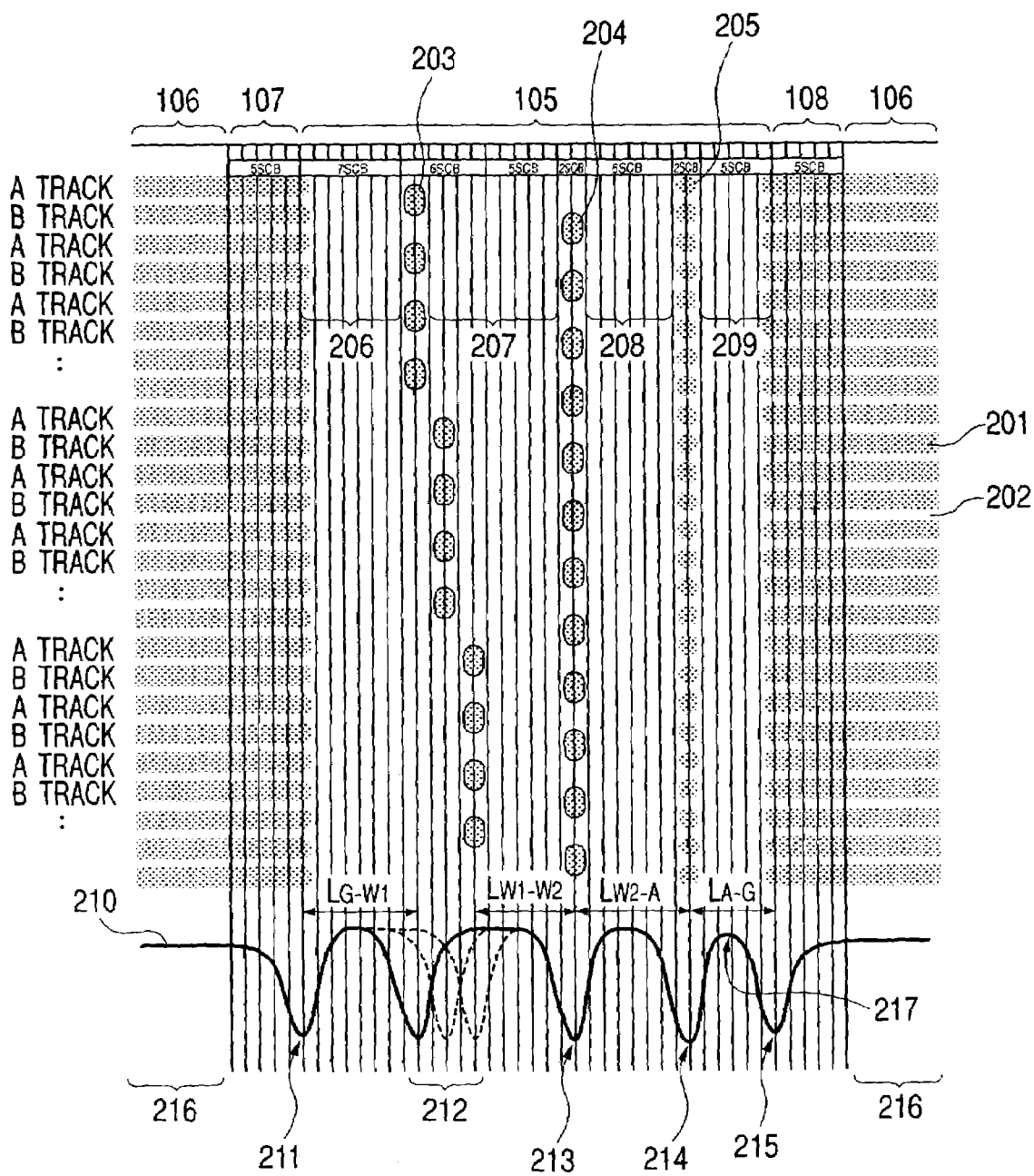
FIG. 2 is an illustration for a servo area of an optical recording medium and its reproduction sum signal according to the first embodiment of the present invention.

FIG. 2 illustrates details of the servo area 105 of the optical recording medium of the present invention. The servo area is provided in a flat section that divides grooves 201 and is constructed of a pair of wobble pits, that is, first wobble pits 203 and second wobble pits 204, and address pits 205. The grooves 201 are separated from each other by a land 202 and tracks for recording data are in the grooves 201. A space 206 is provided between the grooves 201 and the first wobble pits 203 and the space 206 constitutes a mirror section provided with no grooves 201. Likewise, a space 207 is provided between the first wobble pits 203 and second wobble pits 204, a space 208 is provided between the second wobble pits 204 and address pits 205 and a space 209 is provided between the address pits 205 and the next grooves 201.

The first wobble pits 203 and second wobble pits 204 are distributed equidistantly in the radial direction from the center of a track and arranged alternately on an extension of the lands 202 in the track direction. The arrangement of these wobble pits allows a tracking signal to be obtained even if the track pitch (center distance between neighboring grooves) is equal to or shorter than a resolution limit of the light beam. For example, according to this embodiment, the track pitch Tp=540 nm, and there will be no problem even if the optical specification of the recording/reproduction apparatus (not shown) is assumed to be a wavelength λ=660 nm, objective lens NA=0.60 and the full width at half maximum (FWHM) of the diameter of a light spot generated is 570 nm which is greater than the track pitch.

The first wobble pits 203 are arranged in such a way as to occupy one of three locations as shown in FIG. 2. The position of the first wobble pits 203 changes cyclically every 20 tracks (consisting of 10 pairs of track A and track B). This is intended to detect the direction of a light beam that traverses the optical recording medium in the radial direction using the technology disclosed in Japanese Patent Application Laid-Open No. 63-225924. Detecting the positions of the first wobble pits makes it possible to easily determine the moving direction and moving distance of the light beam with respect to the recording medium and allows quick access to a target track.

The optical recording medium according to the present invention adopts oval-shaped wobble pits which are longer in the radial direction to especially improve this function of traverse direction detection. More specifically, the length in the track direction (Lt) is approximately 400 nm and the length in the radial direction (Lr) is approximately 600 nm. Adopting this shape allows the amplitude of the first wobble signal to be obtained even if a light spot is located at a midway point between the wobble pits, thereby providing reliable traverse direction detection. An optimum wobble pit shape can be expressed by the following expressions using FWHM of the light spot:

$$0.55\ \text{FWHM} < Lt < 0.8\ \text{FWHM} \quad (1)$$

$$0.8\ 0\text{FWHM} < Lr < 1.1\ \text{FWHM} \quad (2)$$

When the length in the track direction (Lt) is equal to or shorter than a lower limit, the degree of modulation of a wobble signal becomes insufficient and when it is equal to or greater than an upper limit, interference between the first wobble signal and second wobble signal becomes a problem. With regard to the length in the radial direction (Lr), Lr equal to or lower than a lower limit results in an insufficient degree of modulation of the wobble signal when the light spot is located at a midway point between wobble pits, and Lr equal to or greater than an upper limit results in an increase in the amount of tracking offset when the recording medium substrate is tilted in the radial direction.

Furthermore, the second wobble pits 204 also function as clock pits. This eliminates the need to provide special clock pits, thereby making it possible to improve the format efficiency. Reference numeral 205 denotes address pits for providing address information. Details of address detection will be explained in detail in a third embodiment.

Then, the output waveform when the light beam (light incident on a side opposite to the side of plane on which grooves of the transparent substrate are formed) scans a track will be shown in association with the arrangement of the respective pits in FIG. 2. The output waveform when the groove track is scanned appears like the sum signal 210. When the light beam moves from the groove 201 (data area 106) to the servo area, it is possible to detect a downward convex signal as if pits exist. This is called a "groove end signal" 211. When scanning continues, the first wobble signal 212, second wobble signal 213 and address signal 214 are detected in that order. As described above, the first wobble pits occupy one of the three locations, and therefore the first wobble signal 212 shows three ways of output. When the light beam moves from the servo area to the data area and reenters a groove, a groove start signal 215 appears. The groove start signal 215 has a waveform symmetrical to the groove end signal and it is also possible to detect a downward convex signal as if pits exist. Simple detection of a groove start and a groove end using this downward convex signal will be described later.

It is also possible to provide a post-write area 107 and pre-write area 108 between the data area 106 and servo area 105. This area is an area where the data area signal 216 changes to the groove end signal 211 or an area where the groove start signal 215 changes to a data area signal, and the level of a sum signal is different from that of a normal data area. Data can also be recorded in these areas, but it is undeniable that the signal quality deteriorates. This embodiment provides the post-write area 107 and the pre-write area 108 where user data of approximately 1.5 times (approximately 0.85 μm) the FWHM of the diameter of the light spot is not recorded. A repetitive pattern of a certain mark length, etc., may be recorded in these areas as padding data. Reference numeral 217 denotes the maximum value of sum signal between the address pit and the groove start.

By the way, SCB (Servo Channel Bit) displayed as a scale on the horizontal axis is used as a unit expressing a length, and 1 SCB=169 nm. The servo area of this embodiment has 33 SCB (approximately 5.5 μm). Each pit has a size of approximately 2 SCB and details of space arrangement between the respective pits will be explained in detail in Embodiment 2.

Figure 3:
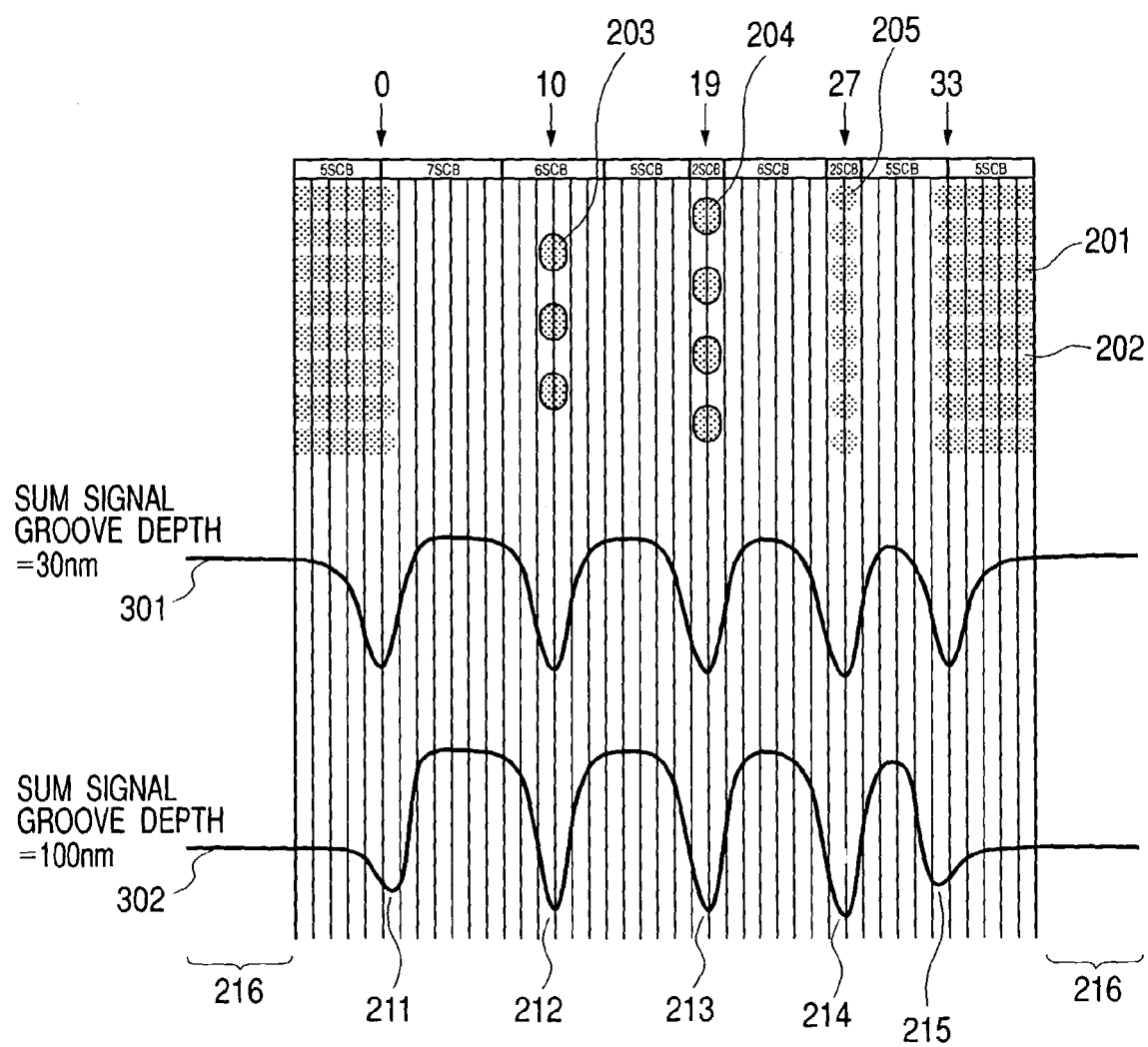
FIG. 3 is an illustration for a condition for obtaining preferred groove start and end signals according to the first embodiment of the present invention.

The configuration of the optical recording medium for detecting a downward convex signal at the groove end and the groove start will be explained in more detail using FIG. 3. Reference numerals of FIG. 3 that are the same as those used in FIG. 2 denote the same features. In FIG. 3, each groove 201 is 30 nm in depth, the half-width of each groove is 440 nm, the half-width of each land is 100 nm and track pitch Tp=540 nm. Data is recorded in the grooves and the sum signal waveform 301 is shown in association with the positions of the respective pits assuming that the optical specification of the recording/reproduction apparatus (not shown) is a wavelength λ=660 nm and objective lens NA=0.60.

As the configuration for detecting a downward convex signal at the groove start and end, any configuration is acceptable as far as it provides groove recording and the depth of the groove $D_G$ and distance $L_s$ (space 206, 209) from the groove edge to the pit satisfy the following condition:

$$D_G/(\lambda/N) < 0.16 \quad (3)$$

$$L_s > 1.2 \text{ FWHM} \quad (4)$$

Figure 19:
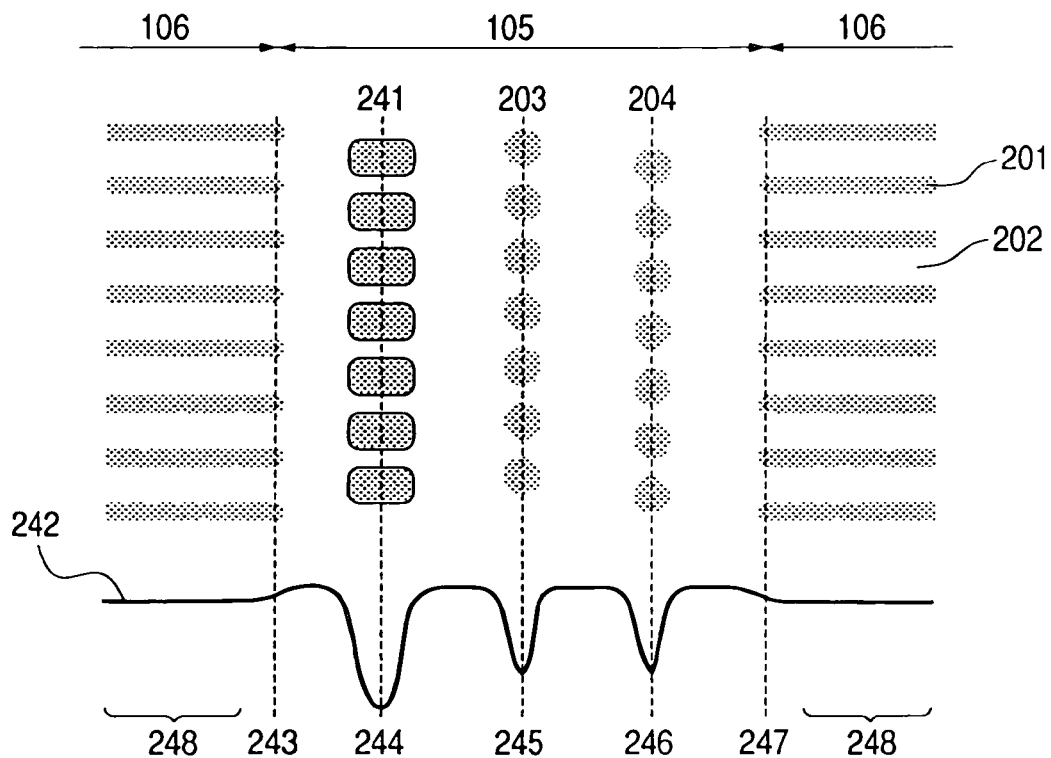
FIG. 19 is an illustration for servo areas of the optical recording medium of FIG. 18 and its reproduction sum signal.
Figure 20:
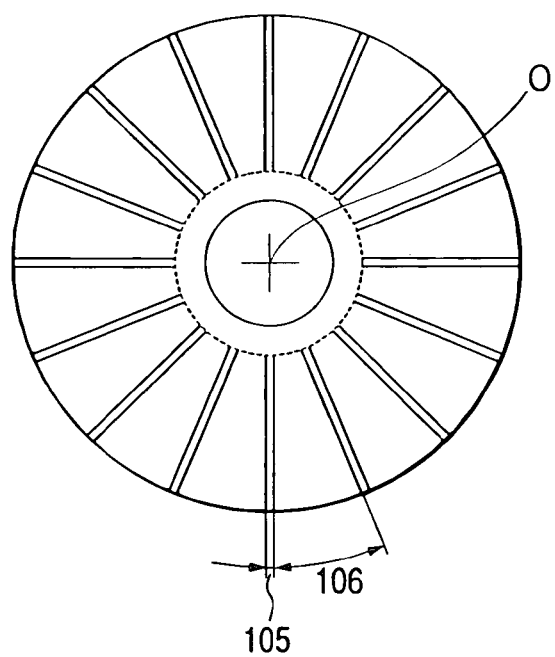
FIG. 20 is a plan view showing a configuration of the conventional optical recording medium.

FWHM represents a full width at half maximum of the diameter of the light spot that scans the optical recording medium, λ represents a wavelength and N represents an index of refraction with respect to λ of the substrate of the optical recording medium. Here, groove recording refers to a recording system in which a data recording track is present in a groove and the edge of the recording track (which corresponds to the groove edge in this embodiment) has a closed contour as shown in FIG. 2. On the other hand, land recording refers to a recording system in which a data recording track exits between grooves and the edge of the recording track does not have any closed contour as shown in FIG. 19.

Grooves may have a concave shape or a convex shape with respect to their peripheries. Grooves may also be concave or convex with respect to the light beam for carrying out recording/reproduction.

Then, in the case of groove recording, if it does not satisfy the condition of Expression (3), it is not possible to detect a downward convex signal at the groove start and end. For example, a waveform at the groove start and end obtained from a groove of 100 nm in depth ($D_G/(\lambda/N)$=0.23, where N=1.5) will be shown for a comparison. For the sum signal 302 as the comparative example, the groove depth is too much, which causes the level of the data area signal 216 to decrease drastically and also causes the groove end signal 211 and groove start signal 215 to become only slightly downward convex. Detection of the groove start and end using these waveforms requires that level detection be carried out with a predetermined threshold as described in the conventional example.

Furthermore, it is observed that the positions of extreme values of the groove end signal 211 and groove start signal 215 are also shifted from the groove edge toward the servo area side. Here, the groove edge refers to the position where the light beam of a master disk production apparatus for making a master disk of the optical recording medium turns on (groove start) and turns off (groove end) and corresponds to both edges of the servo area 105 in FIG. 2. These groove edge positions are strictly associated with the positions where the light beam of the master disk production apparatus turns on a photoresist to expose each pit to light, and therefore if the positions of the groove edges can be detected accurately, the arrangements of the respective pits can also be detected accurately in the same way. In addition, since the angle of inclination of the groove cannot be made vertical outside the range of Expression (3), it is difficult to associate the positions of the extreme values of the groove end signal 211 and groove start signal 215 with the positions of the extreme values of the respective pit signals (212, 213, 214) accurately. Within the range of Expression (3), even a relatively smooth groove with an angle of inclination of the groove of approximately 30° can associate the positions of the extreme values of the groove end signal and groove start signal with the positions of the extreme values of the respective pit signals accurately.

Expression (3) preferably has the following range:

$$0.04 < D_G/(\lambda/N) < 0.13 \quad (3)'$$

Since the lower limit fully secures the degree of modulation of the groove end signal and groove start signal, the upper limit is in the range in which the above-described preferred effect can be expected.

The condition of Expression (4) specifies the distance from the groove end to the first wobble pit (space 206) and the distance from the address pit to the groove start (space 209). The distance $L_s$ from the groove edge to the pit corresponds to the spaces 206 and 209 in the embodiment, but the arrangement of the respective pits is not limited to this and it should be understood as the distance from the groove edge to the closest pit. The condition of Expression (4) is a lower limit of the space from the groove end to the pit closest thereto and at values lower than the lower limit, an upward convex signal cannot be output in a satisfactory manner in the space due to interference between the groove end and the pit closest thereto. Consequently, a satisfactory downward convex signal cannot be output at the groove edge.

Expression (4) preferably has the following range:

$$L_s > 1.5 \text{ FWHM} \quad (4)'$$

Figure 4:
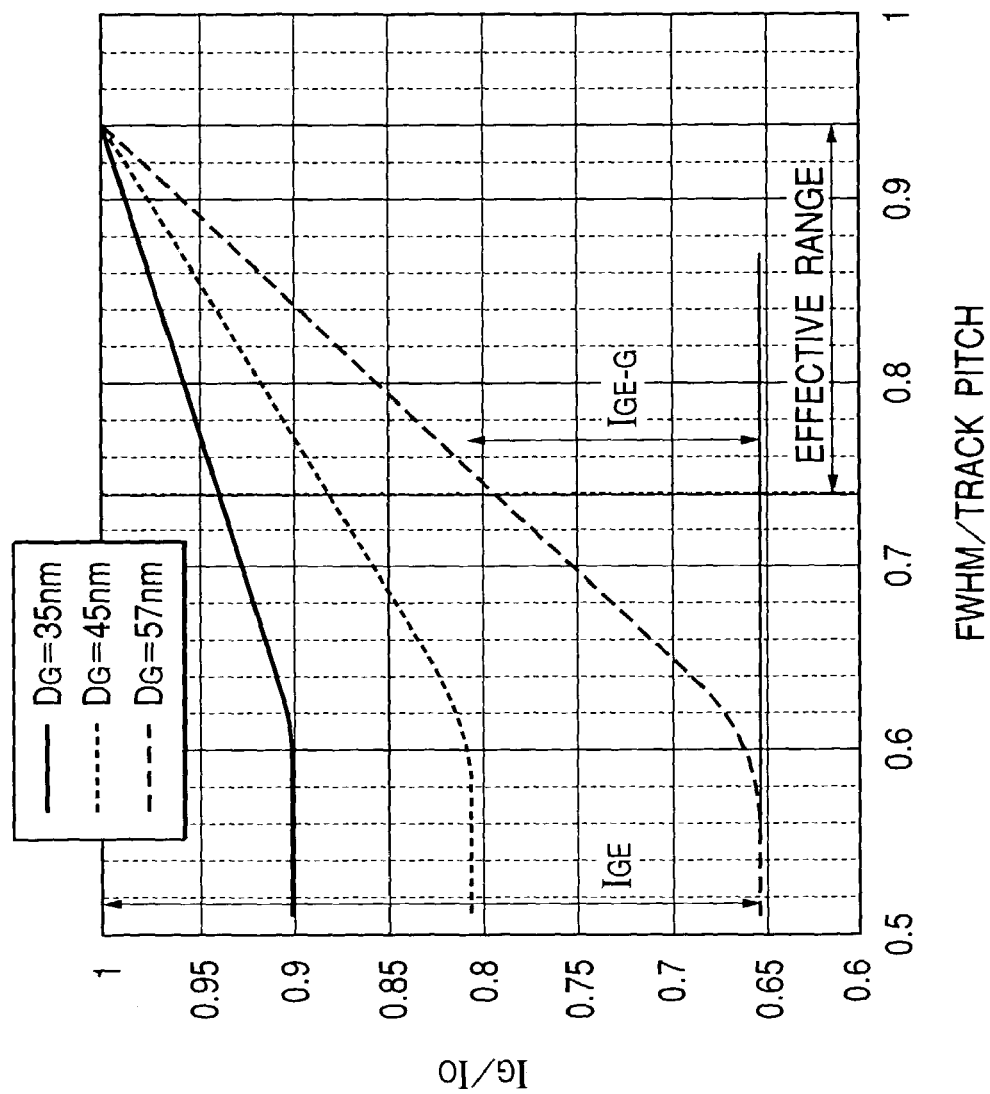
FIG. 4 is an illustration for a condition for obtaining preferred groove start and end signals according to the first embodiment of the present invention.
Figure 5:
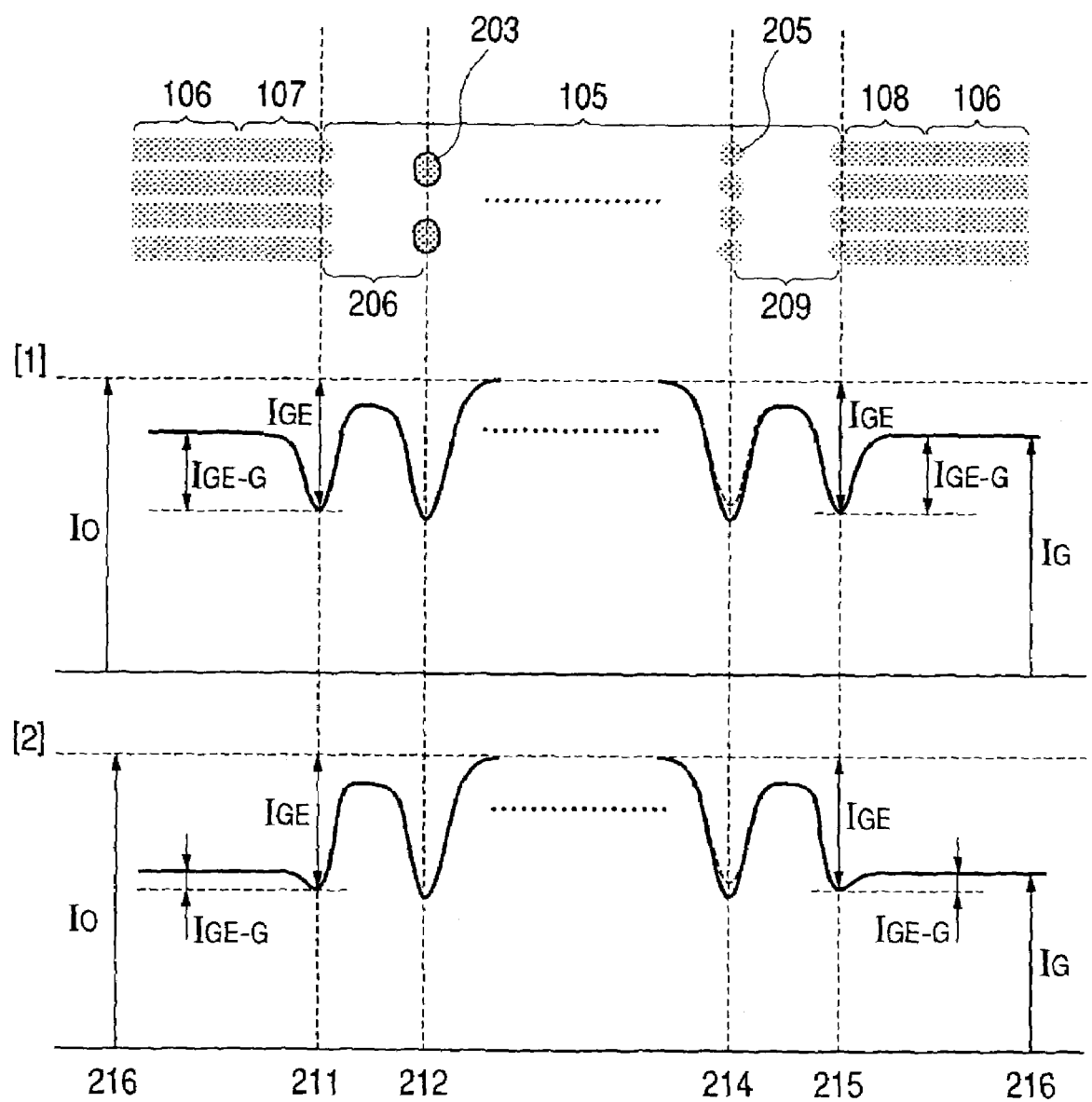
FIG. 5 is an illustration for the groove start and end signals in FIG. 4.

Furthermore, a more preferable configuration of an optical recording medium for detecting a downward convex signal at the groove start and end will be explained in detail using FIG. 4 and FIG. 5. FIG. 4 shows details of an examination of a sum signal obtained when the depth of the groove $D_G$ and width of the groove $W_G$ (see FIG. 17) are changed with the track pitch Tp fixed to 540 nm. FIG. 5 shows the correspondence between the symbols and waveform of the sum signal used in FIG. 4. Reference numerals of FIG. 5 being the same as those of FIG. 2 denote the same. By the way, between the first wobble pit 203 and address pit 205 in FIG. 5, both pit arrangement and sum signal are the same as those in FIG. 3, and therefore they are omitted.

In FIG. 4, the horizontal axis represents groove width $W_G$ normalized with a track pitch Tp ($W_G$/Tp) and the vertical axis represents the level $I_G$ of the sum signal of the data area normalized with the level $I_0$ of the sum signal of the flat section (mirror section) having no pits in the servo area ($I_G/I_0$). With regard to the groove depth, cases of $D_G$=35 nm, 45 nm and 57 nm were examined. In any groove depth, when the ratio of the groove width to the track pitch ($W_G$/Tp) is smaller than 0.6, $I_G$ and the level of the sum signals at the groove start and end almost match each other, and favorable downward convex signals cannot be obtained at the groove start and end. On the other hand, when ratio $W_G$/Tp is greater than 0.6, the signal level $I_G$ of the data area gradually increases and exceeds the signal level at the groove start and end, thereby generating favorable groove start and end signals. That is, in FIG. 5, a difference $I_{GE-G}$ ($=I_{GE}-I_0+I_G$) between the minimum value of the groove start and end signals and the signal level of the data area increases.

As shown in FIG. 4, when the above-described $I_{GE-G}$ is examined in the range of the groove depth in Expression (3)', it is substantially proportional to $W_G$/Tp in the area where the ratio $W_G$/Tp is greater than 0.6. In the area $W_G$/Tp>0.74 in particular, $I_{GE-G}/I_{GE}$>0.4 and a downward convex signal, which is good enough to detect the groove start and end can be obtained. On the other hand, in the area $W_G$/Tp>0.94, the land width $W_L$ (see FIG. 17) becomes approximately 30 nm, too small to make a master disk to obtain a stable groove start and end signals. Since this upper limit is set for convenience of production of the master disk, the upper limit need not be observed if a more elaborate master disk production apparatus is used.

As set out above, to detect a favorable downward convex signal at the groove start and end, it is preferable that the ratio of the groove width $W_G$ to the track pitch Tp satisfy the following expression in addition to Expression (3)' and Expression (4):

$$0.74 < W_G/Tp \tag{5}$$

As an example, FIG. 5 shows a sum signal waveform for preferable groove start and end signals [1] and an undesirable comparative example [2], where track pitch Tp=540 nm, wavelength λ=660 nm and objective lens NA=0.60. the case [1] shows an example of the depth of the groove $D_G$=57 nm, the width of the groove $W_G$=440 nm ($W_G$/Tp=0.82). With $I_G/I_0$=0.87 and $I_{GE\text{-}G}/I_{GE}$=0.63, it was possible to obtain a downward convex signal good enough to detect the groove start and end. Furthermore, as a comparative example, an example of the depth of the groove $D_G$=57 nm and the width of the groove $W_G$=360 nm ($W_G$/Tp=0.67) is shown. In the comparative example, because the width of the groove is narrow, the level of the data area 216 decreases drastically and both the groove end signal 211 and groove start signal 215 become only slightly downward convex. More specifically, with $I_G/I_0$=0.72, $I_{GE\text{-}G}/I_{GE}$=0.2, it is necessary to detect levels with the predetermined threshold described in the conventional example in order to detect the groove start and end.

Furthermore, as shown in FIG. 4, the level $I_{GE}$ of the groove start and end signals depends on the depth of the groove and when the depth of the groove is $\lambda/(4N)$ or below, the level decreases as the depth of the groove increases and it is possible to obtain a signal with good S/N. However, if the groove is deeper than necessary, $I_G$ almost matches the level of the sum signal at the groove start and end, thereby preventing the generation of a favorable downward convex signal. Furthermore, the positions of extreme values of the groove end signal 211 and groove start signal 215 are shifted toward the servo area side as described above.

By the way, for convenience of production of a master disk, the wobble pits and address pits generally have a depth equal to the depth of the groove. The wobble pits and address pits are preferably deeper than the depth of the groove from the standpoint of securing S/N of the signal. For example, it is preferably selected from a range of a value equal to the depth of the pits to double the depth of the pits.

Furthermore, this embodiment has described the areas where wobble pits and address pits exist as the servo area 105, but even if these areas are replaced with a pre-pit area where arbitrary pit information exists collectively, it is possible to obtain a downward convex signal at the groove start and end as far as the width of the groove, pit arrangement and groove width satisfy Expression (3) and Expression (4), and preferably Expression (5). If a downward convex signal exists before and after this pre-pit area, it can be a favorable signal to detect the start and end positions of the groove as in the case of this embodiment. This embodiment was successful in achieving a great effect using a downward convex signal detected at the groove start and end in order to detect wobble pits and address pits. When arbitrary pit information arranged in the pre-pit area divided by a groove is also detected, this downward convex signal can be a stable reference position, and therefore effects similar to those of this embodiment can be expected. Thus, the information arranged in the servo area 105 according to the present invention can be any pits and are not necessarily limited to wobble pits and address pits.

Furthermore, this embodiment has described pits in the servo area as having optical phase differences of projections and depressions, but similar effects can be expected from pits having a reflectance different from that of peripheries or pits using a magneto-optical Kerr effect as far as the depth of the groove, pit arrangement and the width of the groove satisfy Expression (3) and Expression (4), and preferably Expression (5), and in this way the present invention is not limited to this.

Figure 6:
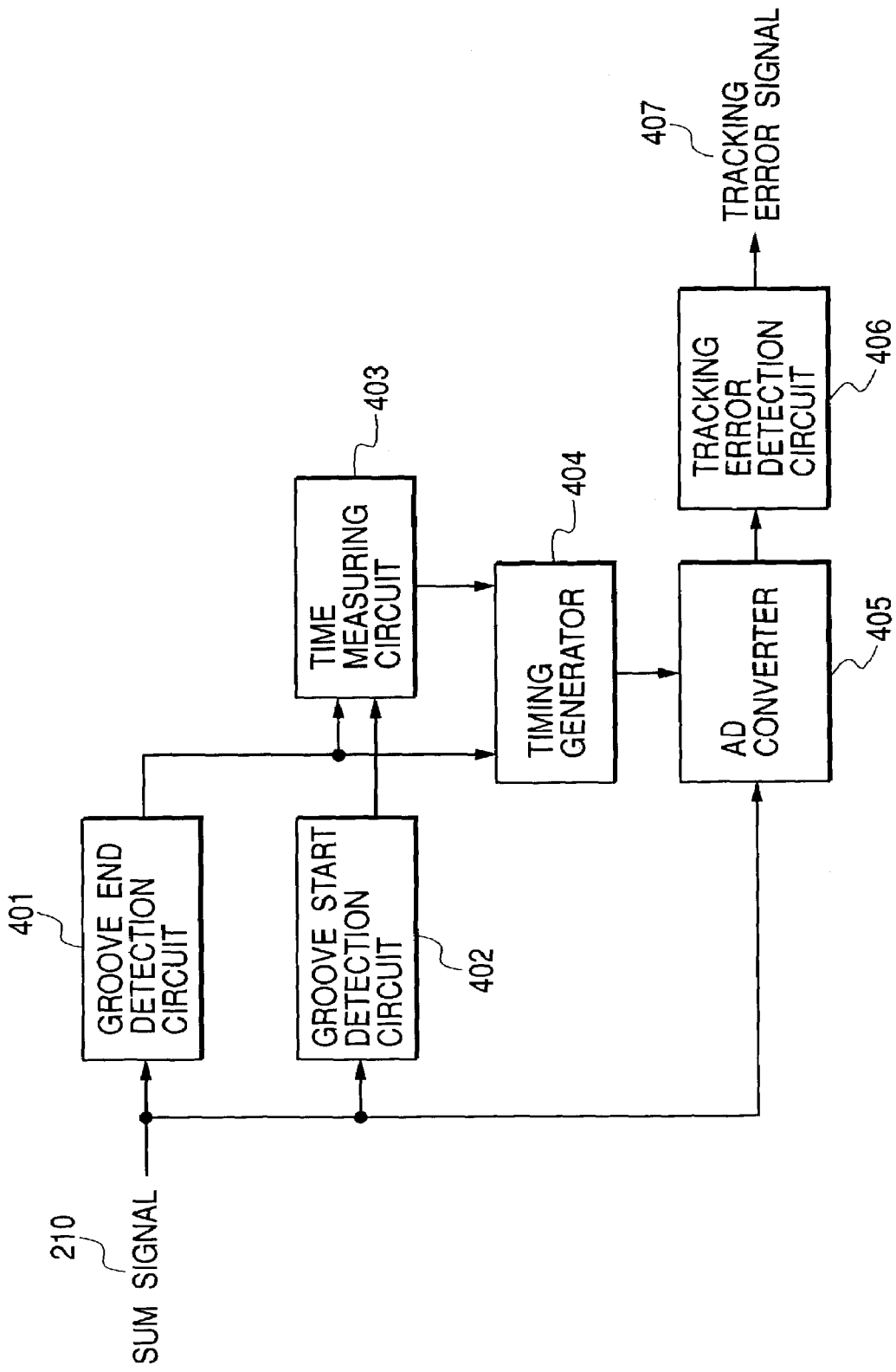
FIG. 6 is a block diagram of a tracking error signal generation circuit using the optical recording medium according to the first embodiment of the present invention.

Next, an example of a tracking error signal generation circuit using the optical recording medium according to the present invention will be shown. FIG. 6 is a block diagram and reference numeral 210 denotes a sum signal reproduced from the optical recording medium, 401 denotes a groove end detection circuit that detects a groove end, 402 denotes a groove start detection circuit that detects a groove start, 403 denotes a time measuring circuit that detects a time between the end and start of the detected groove, 404 denotes a timing generator that generates a timing signal of each pit such as wobble pit in the servo area, 405 denotes an AD converter that A/D-converts the analog sum signal 210 using a timing signal from the timing generator 404, and 406 denotes a tracking error detection circuit that detects a tracking error signal from the output signal from the AD converter 405.

The numerical value "0" SCB on the scale of the horizontal axis in FIG. 3 denotes the end of the groove and "33" SCB denotes the start of the groove. Assuming that the end of the groove is 0, the positions of "8" SCB, "10" SCB and "12" SCB correspond to the first wobble pits, the position of "19" SCB corresponds to the second wobble pits and the position of "27" SCB corresponds to the address pits. The example in FIG. 3 shows a case where the first wobble pits exist in the position of "10" SCB. When the light beam scans such a servo area in the track direction, the sum signal waveform 210 (or reference numeral 301 of FIG. 3) shown in FIG. 2 is obtained and the waveform at the end and start of the groove becomes as if clock pits exist.

The groove end detection circuit 401 detects the groove end timing (position of the extreme value of the groove end signal) by using this sum signal waveform 210 as an input. This can be detected easily by differentiating the sum signal waveform 210 and binarizing it. Likewise, the groove start detection circuit 402 detects the groove start timing (position of the extreme value of the groove start signal) using 210 as an input.

The time measuring circuit 403 measures the time interval between two points of the groove end and groove start detected by the groove end detection circuit 401 and groove start detection circuit 402 and outputs it to the timing generator 404. The timing generator 404 detects the positions of the first wobble pits and the positions of the second wobble pits from the groove end timing and the time interval, and the AD converter 405 regards the timings of these two positions as conversion timings of an analog sum signal.

That is, since the positions of the first and second wobble pits in the servo area 105 are known beforehand, the timing generator 404 detects manifestation timings of the first and second wobble pit signals (212, 213) based on the groove end timing and time interval between the groove end and groove start. The AD converter 405 AD-converts the level of a reproduction analog signal at the manifestation timing of the first and second wobble pit signals (212, 213). The tracking error detection circuit 406 generates a tracking error signal 407 by calculating a difference in the AD-converted value of the analog sum signal 210 between the two wobble pit signal manifestation timings and outputs it to a servo control circuit (not shown). The servo control circuit performs tracking control of light spots using intermittently created tracking error signals.

In FIG. 6, the time measuring circuit 403 can be constructed of a digital circuit using a counter capable of being reset at the groove end and carrying out one count for every clock from the groove end. The clock frequency is, for example, 45 MHz. When the groove end and groove start are detected by the groove end detection circuit 401 and groove start detection circuit 402, the time interval can be measured by the counter. Since the above-described count value of the time measuring circuit 403 corresponds to a time of 33 SCB, when a detection timing of the first wobble pit is generated, the output count value is multiplied by 10/33 times and when a detection timing of the second wobble pit is generated, the output count value is multiplied by 19/33 times, the sum signal waveform 210 is AD-converted at that timing, and the difference is calculated by the tracking error detection circuit 406 and a tracking error signal 407 can be obtained.

For example, when the optical recording medium is rotated at 1200 rpm, at a radial position of 20 mm the scanning time of 5.5 µm from the groove end to the groove start is 99 counts when counted with a clock of approximately 2.2 µs, 45 MHz, and therefore the count value at the first wobble pit detection timing becomes 99×10/33=30 counts. Such an embodiment can construct the entire circuit with a digital circuit, having the great advantage that it can be easily constructed with ICs, etc.

When a reproduction sum signal was measured by using the optical recording medium having the configuration of the present invention, the groove start and end signals could be detected stably before and after tracking pull-in. Moreover, the groove start and end signals were obtained as a downward convex signal as if pits were arranged at the groove edge, and therefore it was confirmed that the groove start and end positions could be easily detected by detecting a 0 cross using a differential circuit. Therefore, it was possible to detect a groove start and end signals using an inexpensive detection circuit in a sampled servo system with the fixed length of the servo area regardless of the position in the radial direction and realize quick, stable clock detection and tracking pull-in. Furthermore, the optical recording medium according to the present invention allows wobble pits to also function as clock pits simultaneously and thereby improves the format efficiency, while it is also confirmed that using an MCLV-based recording/reproduction method can also realize quick, stable clock detection and tracking pull-in with an inexpensive digital circuit.

Figure 18:
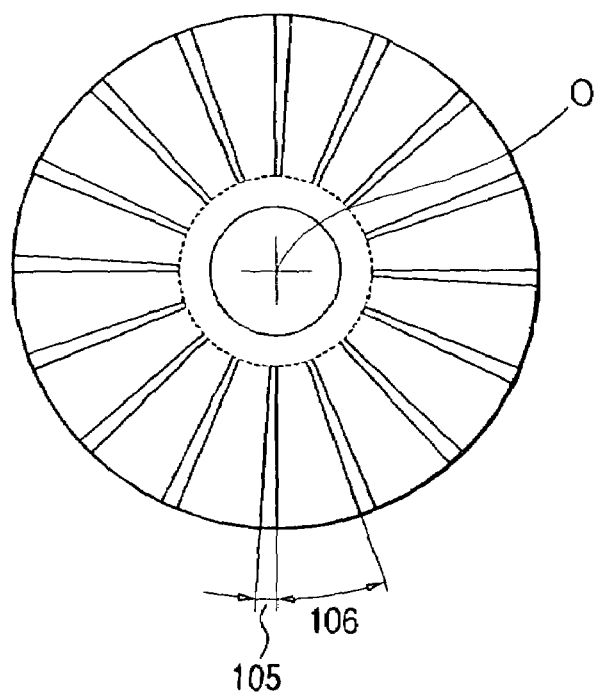
FIG. 18 is a plan view showing a configuration of a conventional optical recording medium.

This embodiment has been explained assuming that the length of the servo area is fixed regardless of the position in the radial direction, but the present invention is not limited to this because similar effects can be expected also in such a configuration in which the servo area gradually extends toward the circumferential direction as shown in FIG. 18 when clock pits cannot be detected stably due to tracking OFF.

(Embodiment 2)

Embodiment 2 will explain the optimization of arrangement of the first wobble pits 203, second wobble pits 204 and address pits 205 in the optical recording medium of the present invention having a groove structure and wobble pit structure described in Embodiment 1. For the arrangement of the respective pits and grooves, see FIG. 2.

Figure 7:
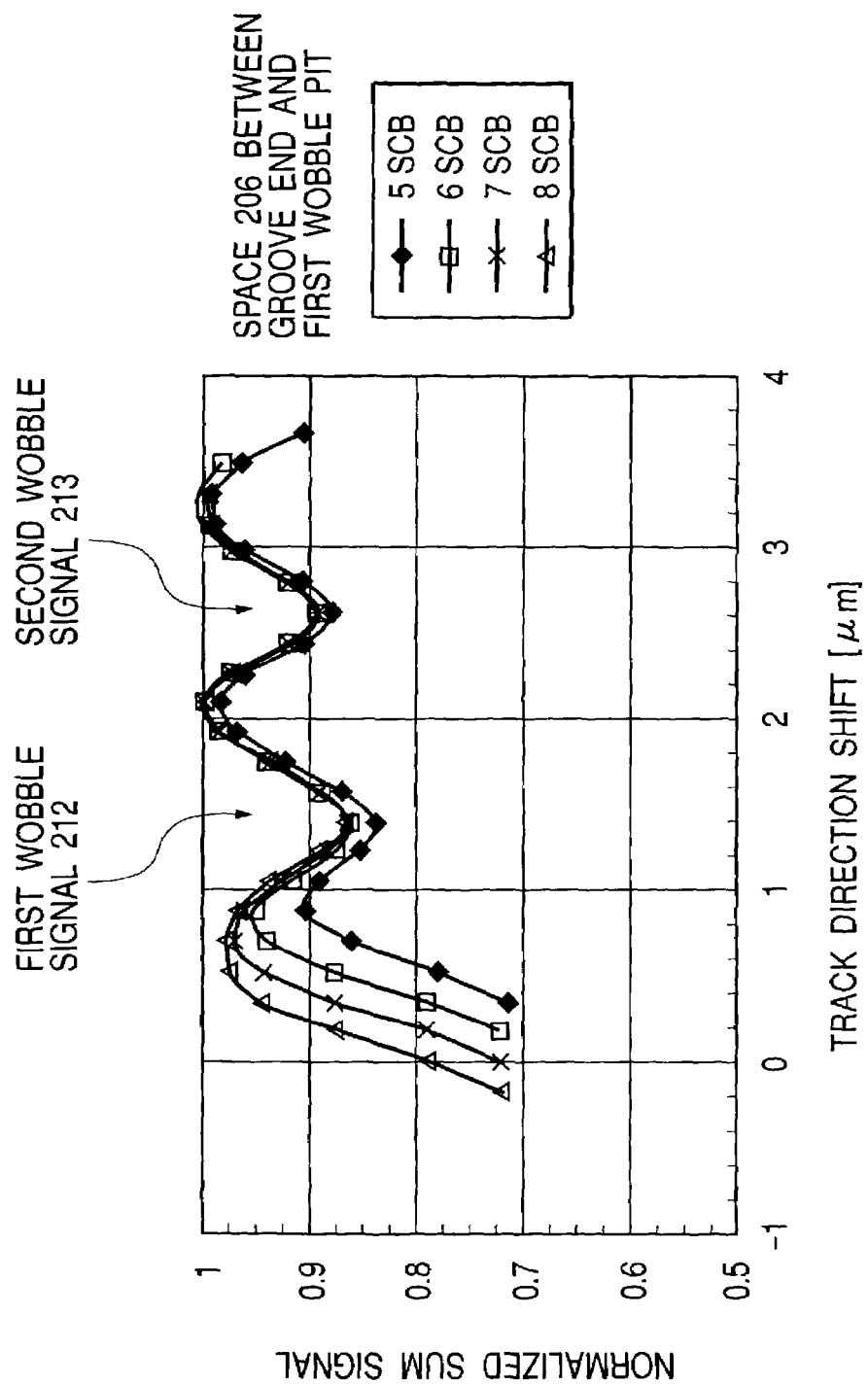
FIG. 7 is an illustration for a simulation waveform of a reproduction sum signal of an optical recording medium according to a second embodiment of the present invention.

FIG. 7 shows the result of a simulation of the output waveform of a sum signal when the distance between the groove end and the first wobble pit, i.e., the space 206 is changed from 5 SCB to 8 SCB. The space 207 is assumed to be 7 SCB and the values shown in FIG. 2 are used for the other spaces (208, 209). The substrate of the optical recording medium is tilted by 13.5 mrad. in the radial direction. The horizontal axis in FIG. 7 expresses the scanning distance of a light beam in the track direction. The space 206 is changed in four ways, but for simplicity of explanation, the same timing is used for detection of various wobble signals. The vertical axis expresses a sum signal normalized by the mirror section. The timings of detection of the first wobble signal 212 and second wobble signal 213 are shown by arrows. By the way, 1 SCB=169 nm and the optical specification of the recording/reproduction apparatus is a wavelength $\lambda$=660 nm and objective lens NA=0.60.

As is apparent from FIG. 7, it is observed that the shorter the space 206, the greater the level difference between the first wobble signal 212 and second wobble signal 213. Moreover when the space 206 is 7 SCB or more, the level difference between the first wobble signal 212 and second wobble signal 213 substantially converges to a fixed value.

Figure 8:
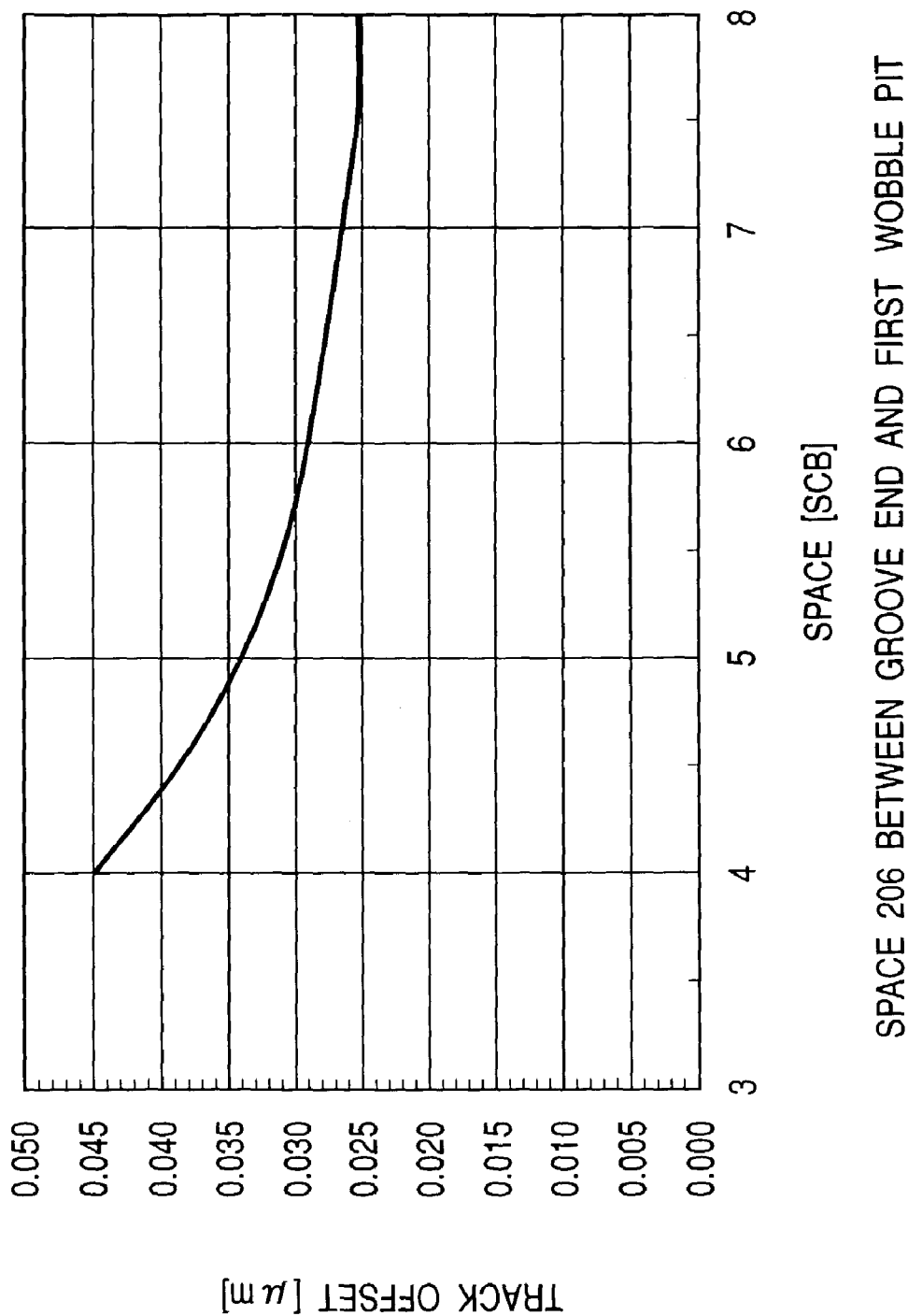
FIG. 8 is an illustration for an amount of offset of the tracking error signal in FIG. 7.

FIG. 8 shows the result of an examination of a tracking offset when a tracking error signal is generated from the first wobble signal 212 and second wobble signal 213 in FIG. 7. The horizontal axis expresses the length (unit: SCB) of the space 206 and the vertical axis expresses the tracking offset (unit: µm). As is apparent from FIG. 8, the tracking offset for the space 206 of 7 SCB or more substantially converges to a fixed value.

As explained in Embodiment 1, the first wobble pits are arranged in such a way as to occupy one of three locations. In FIG. 2, as shown on the topmost side of three arrangement patterns of the first wobble pits, when the groove end is closest to the first wobble pit, 7 SCB or more should be preferably secured for the space 206. Assuming that the center distance between the groove end and the first wobble pit (that is, equivalent to the minimum value of the space 206+1 SCB) is $L_{G-W1}$, it is desirable that 8 SCB or more be secured for the $L_{G-W1}$. When expressed more generally using a full width at half maximum (FWHM) of the diameter of a light spot, it is desirable to satisfy the following expression:

$$L_{G-W1} > 2.3 \text{ FWHM} \tag{6}$$

Figure 9:
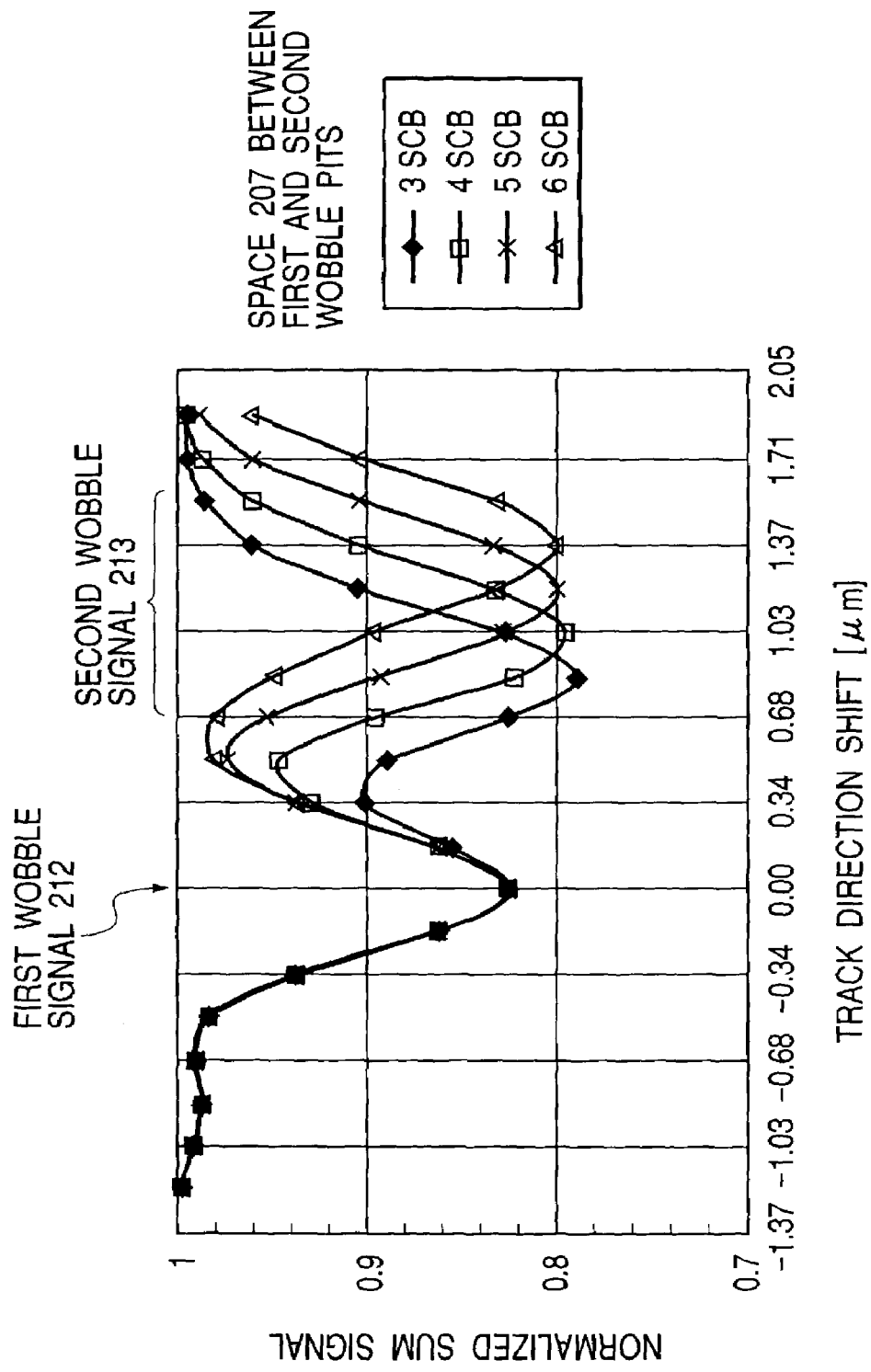
FIG. 9 is an illustration for a simulation waveform of a reproduction sum signal of the optical recording medium according to the second embodiment of the present invention.

FIG. 9 shows the result of a simulation of the output waveform of a sum signal when the distance between the first wobble pit and the second wobble pit, i.e., the space 207 is changed from 3 SCB to 6 SCB. The space 206 is assumed to be 11 SCB and the values shown in FIG. 2 are used for the other spaces (208, 209). The substrate of the optical recording medium is tilted by 13.5 mrad. in the radial direction. The horizontal axis in FIG. 9 expresses the scanning distance of a light beam in the track direction and the position of the first wobble pit is the origin. The vertical axis expresses a sum signal normalized by the mirror section. The timings of detection of the first wobble signal 212 and second wobble signal 213 are shown by arrows. By the way, 1 SCB=169 nm and the optical specification of the recording/reproduction apparatus is a wavelength $\lambda$=660 nm and objective lens NA=0.60.

As is apparent from FIG. 9, it is observed that the shorter the space 207, the greater the level difference between the first wobble signal 212 and second wobble signal 213.

Moreover when the space 207 is 5 SCB or more, the level difference between the first wobble signal 212 and second wobble signal 213 substantially converges to a fixed value.

Figure 10:
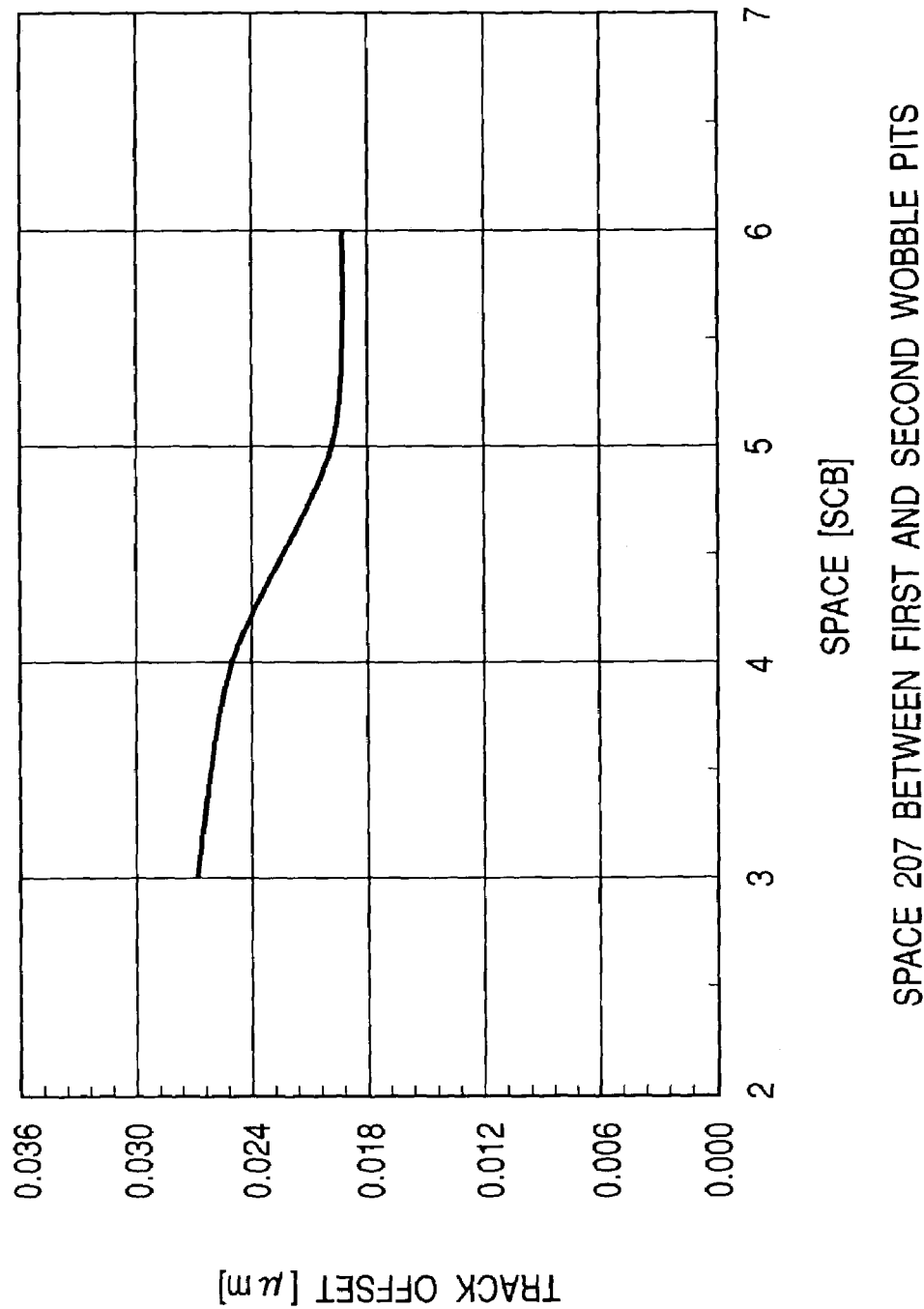
FIG. 10 is an illustration for an amount of offset of the tracking error signal in FIG. 9.

FIG. 10 shows the result of an examination of a tracking offset when a tracking error signal is generated from the first wobble signal 212 and second wobble signal 213 in FIG. 9. The horizontal axis expresses the length (unit: SCB) of the space 207 and the vertical axis expresses the tracking offset (unit: μm). As is apparent from FIG. 10, the tracking offset for the space 207 of 5 SCB or more substantially converges to a fixed value.

In FIG. 2, as shown on the bottommost side of three arrangement patterns of the first wobble pits, when the first wobble pit is closest to the second wobble pit, 5 SCB or more should be preferably secured for the space 207. Assuming that the center distance between the first wobble pit and the second wobble pit (that is, equivalent to the minimum value of the space 207+2 SCB) is $L_{W1-W2}$, it is desirable that 7 SCB or more be secured for the $L_{W1-W2}$. When expressed more generally using a full width at half maximum (FWHM) of the diameter of the light spot, it is desirable to satisfy the following expression:

$$L_{W1-W2} > 2 \text{ FWHM} \tag{7}$$

Figure 11:
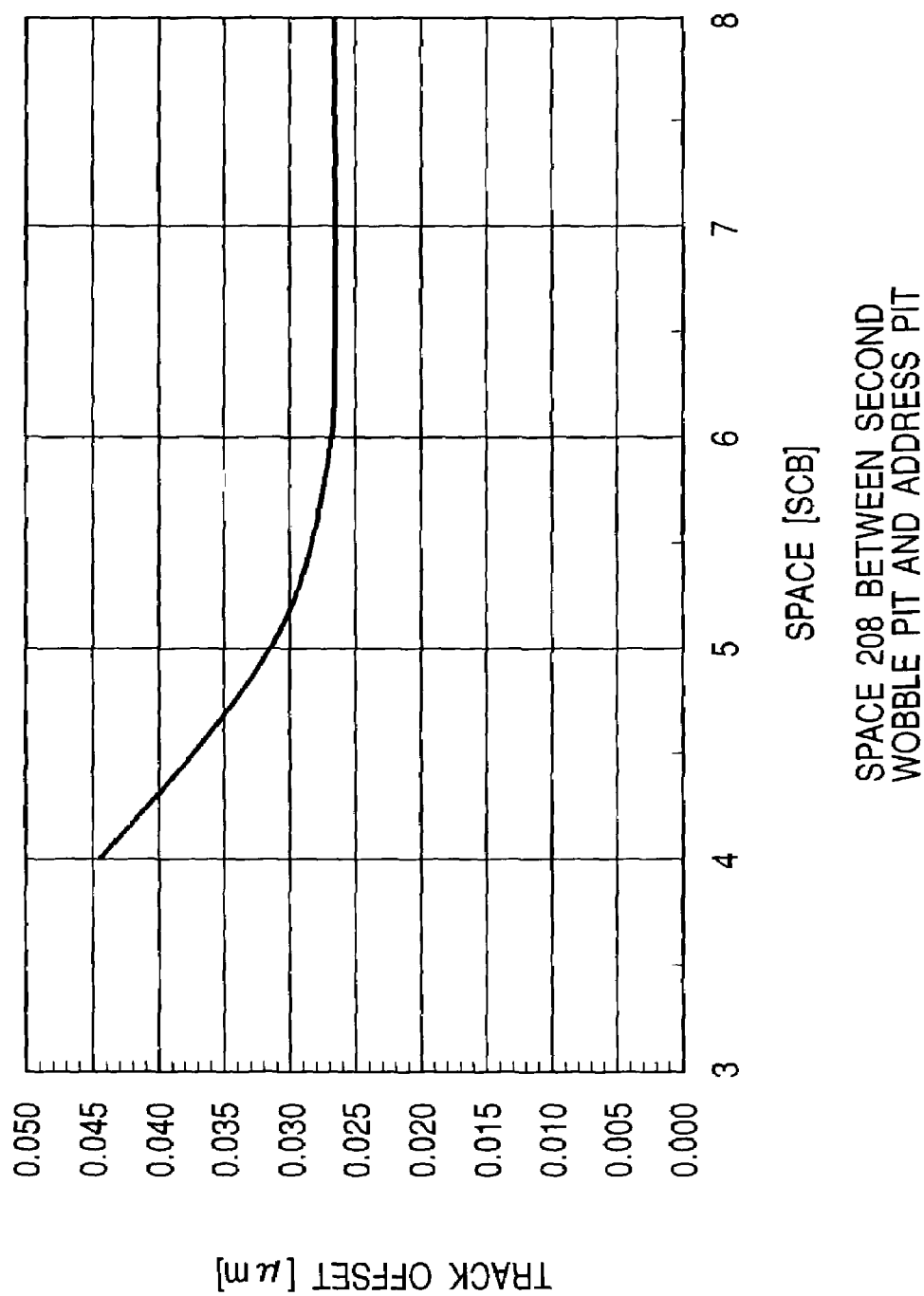
FIG. 11 is an illustration for an amount of offset of a tracking error signal calculated based on the simulation waveform of the reproduction sum signal of the optical recording medium according to the second embodiment of the present invention.

Likewise, FIG. 11 shows the result of an examination of a tracking offset when a tracking error signal is generated by changing the distance between the second wobble pit and the address pit, i.e., the space 208 from 4 SCB to 8 SCB. The horizontal axis expresses the length of the space 208 (unit: SCB) and the vertical axis expresses the tracking offset (unit: μm). The first wobble pits are arranged in the middle of the arrangement 3 pattern in FIG. 2 so as to prevent interference from the groove end and second wobble pits. That is, space 206=9 SCB, space 207=7 SCB and space 209=5 SCB. The address pits 205 express address information by its presence/absence. But of course, when address pits exist, interference with the second wobble pits becomes a problem. The substrate of the optical recording medium is tilted by 13.5 mrad. in the radial direction. By the way, it is assumed that 1 SCB=169 nm, the optical specification of the recording/reproduction apparatus is a wavelength λ=660 nm and objective lens NA=0.60.

As is apparent from FIG. 11, the tracking offset for the space 208 of 6 SCB or more substantially converges to a fixed value. Assuming that the center distance between the second wobble pit and the address pit (that is, equivalent to the space 208+2 SCB) is $L_{W2-A}$, it is desirable that 8 SCB or more be secured for the $L_{W2-A}$. When expressed more generally using a full width at half maximum (FWHM) of the diameter of the light spot, it is desirable to satisfy the following expression:

$$L_{W2-A} > 2.3 \text{ FWHM} \tag{8}$$

Figure 12A:
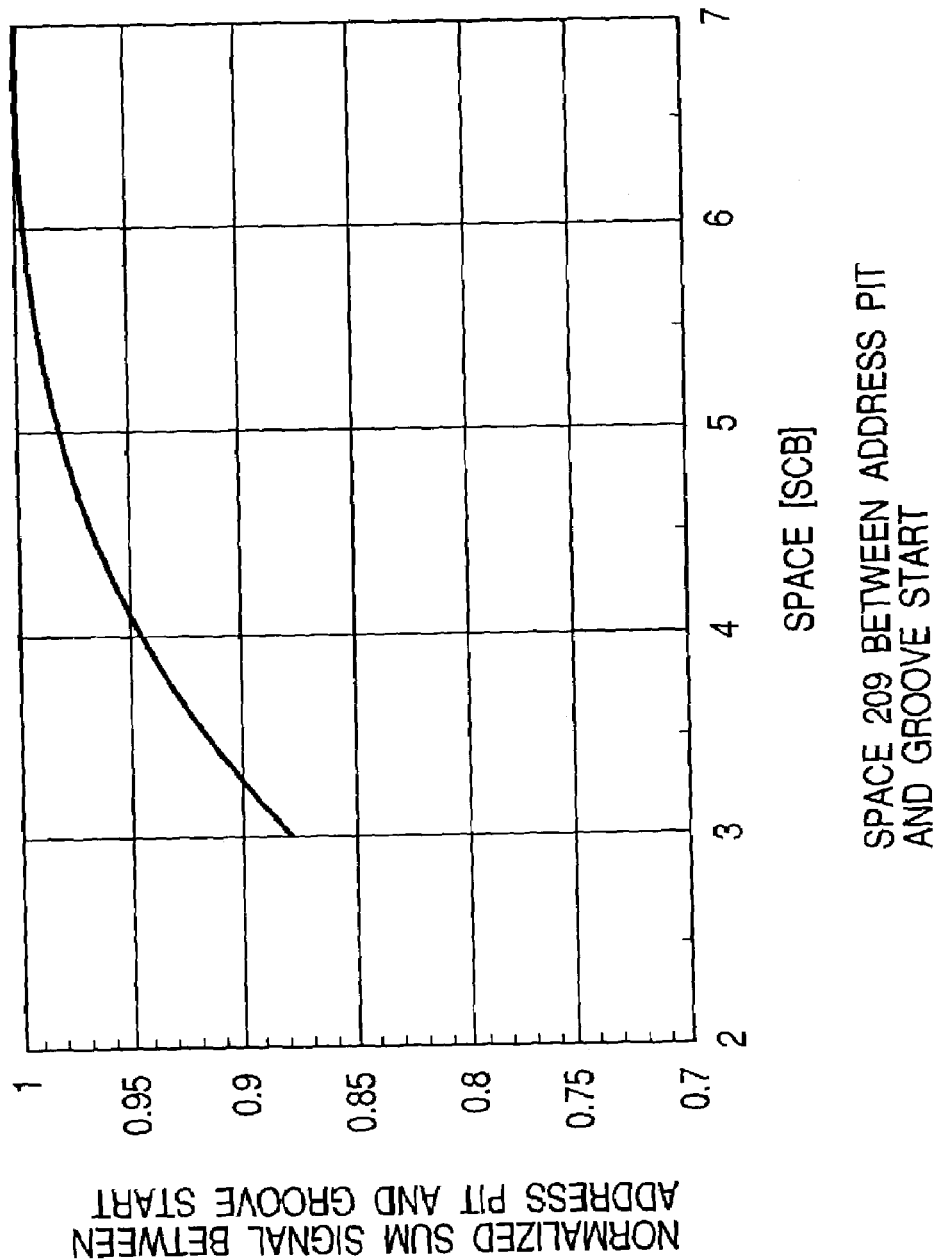
FIGS. 12A and 12B are illustrations for a level of a sum signal calculated based on the simulation waveform of the reproduction sum signal of the optical recording medium according to the second embodiment of the present invention.

Then, FIG. 12A shows a maximum value 217 of a normalized sum signal between the address pit and groove start, which is obtained by using a simulation of changing the distance between the address pit and groove end, i.e., the space 209 from 3 SCB to 7 SCB. The horizontal axis expresses the length of the space 209 (unit: SCB) and the vertical axis expresses the maximum value 217 of the normalized sum signal calculated based on the sum signal of the mirror section.

Figure 12B:
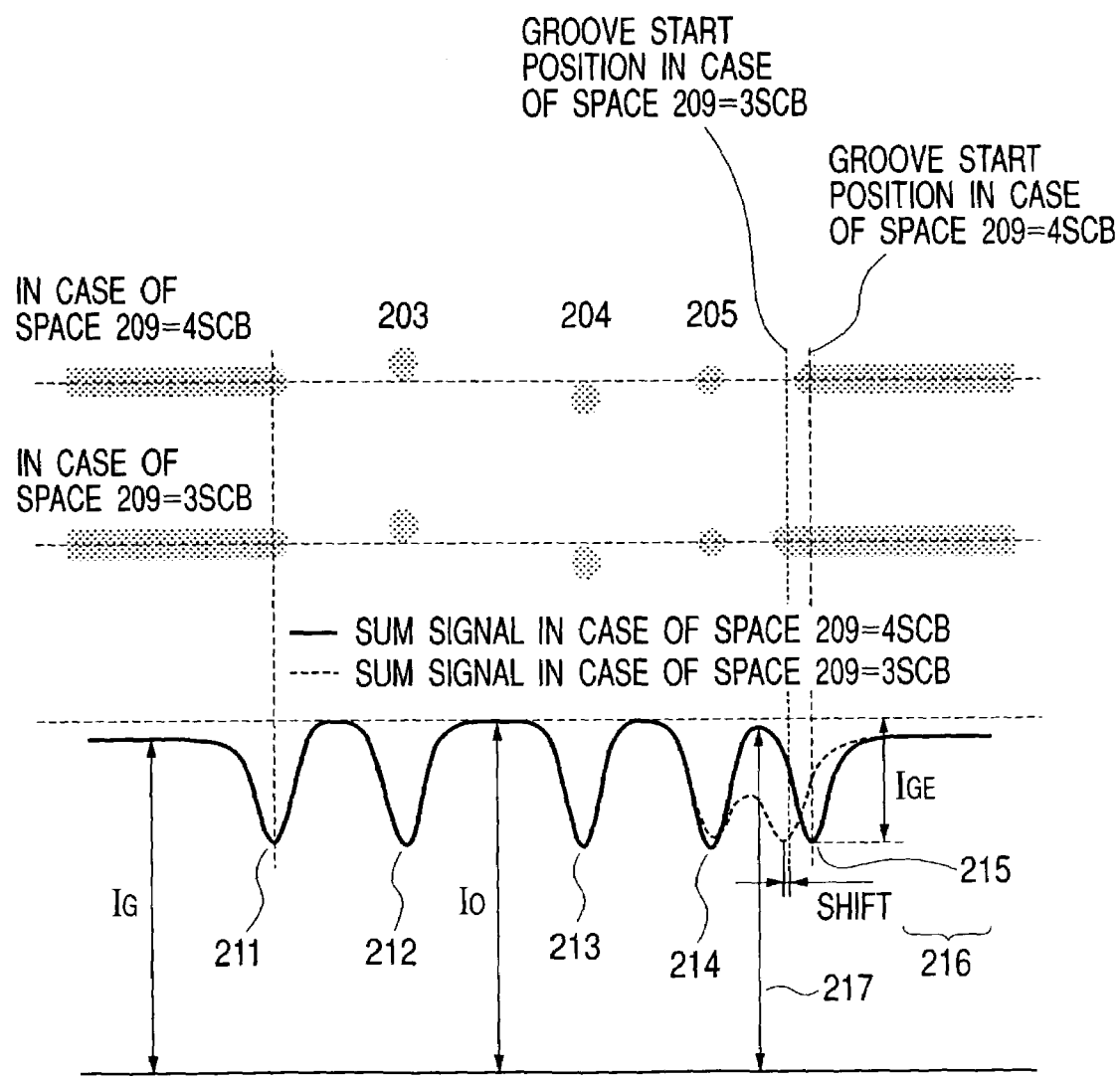

Since the address pits 205 are located in the center of a track, it is possible to take a sufficient degree of modulation even when scanned with a light beam. However, when the distance between the address pit and the groove start is narrowed and the maximum value 217 of the normalized sum signal becomes smaller than the data area signal 216 due to interference between the both, the matching between the extreme value of the groove start signal and the position of the groove start deteriorates as shown in FIG. 12B. As described above, a relatively long distance needs to be secured between the groove end and the first wobble pit (space 206) to prevent offsets from occurring in the tracking signal and a maximum value of a sum signal between the groove end and the first wobble pit is almost equal to that of the mirror section. In order to reliably detect the groove end and start with a simple circuit, it is preferable to prevent considerable loss of symmetry between the groove end signal 211 and groove start signal 215. The reference numerals of FIG. 12B being the same as those of FIG. 2 denote the same.

As is apparent from FIG. 12A, it is observed that the maximum value of the normalized sum signal approximates to 1 when the space 209 is 4 SCB or more. Assuming that the distance between the center of the address pit and the groove start (that is, equivalent to space 209+1 SCB) is $L_{A-G}$, it is desirable to secure 5 SCB or more for $L_{A-G}$. When expressed more generally using full width at a half maximum (FWHM) of the diameter of the light spot, it is desirable to satisfy the following expression:

$$L_{A-G} > 1.5 \text{ FWHM} \tag{9}$$

Or more preferably the space 209 is 5 SCB or more and $L_{A-G}$ is 6 SCB or more.

$$L_{A-G} > 1.8 \text{ FWHM} \tag{9}$$

Considering that the address pits 205 occupy approximately 2 SCB in size, Expression (9) corresponds to Expression (4) and Expression (9)' corresponds to Expression (4)'. That is, $L_s$ corresponds to $L_{A-G}-1[\text{SCB}]$, i.e., $L_{A-G}-0.3$ [FWHM].

Considering Expressions (6) to (9), in order to optimize arrangements of the first wobble pits 203, second wobble pits 204 and address pits 205 in the optical recording medium of the present invention having a groove structure or wobble pit structure shown in Embodiment 1, it is desirable to satisfy the following condition:

$$L_{G-W1}, L_{W2-A} > L_{W1-W2} > L_{A-G} \tag{11}$$

where, $L_{G-W1}$ is a minimum value of a center distance between the groove end and the first wobble pit, $L_{W2-A}$ is a center distance between the second wobble pit and address pit, $L_{W1-W2}$ is a center distance between the first wobble pit and second wobble pit and $L_{A-G}$ is a distance between the center of the address pit and the groove start.

In the optical recording medium having a groove structure and a wobble pit structure as shown in Embodiment 1, when the pit arrangement that satisfies Expressions (6) to (9) was applied, it was confirmed that it was possible to obtain the favorable groove end signal waveform 211, first wobble signal 212, second wobble signal 213, address signal 214, groove start signal waveform 215 and data area signal 216 as shown in FIG. 13.

That is, with regard to the groove end signal waveform 211 and groove start signal waveform 215, the waveform satisfying the following condition was obtained, assuming that the modulation amplitude at the positions of the groove start and end is $I_{GE}$, the level of the sum signal of the data section is $I_G$ and the level of the sum signal in the mirror section is $I_0$:

$$0.1 < I_{GE}/I_0 < 0.4 \quad (11)$$

$$0.4 < (I_{GE} - I_0 + I_G)/I_{GE} \quad (12)$$

From this, a downward convex groove end section signal as if pits were arranged at the end and start of the groove was obtained while securing a favorable S/N of the data area signal 216 irrespective of ON/OFF of tracking servo. Within the range of Expressions (11) and (12), it was possible to know the groove start and end easily and accurately by only detecting 0 cross using a simple differential circuit.

Also with regard to the first wobble signal 212 and second wobble signal 213, it was possible to confirm that a favorable waveform that could satisfy the following condition was obtained, assuming that the minimum modulation amplitude during tracking OFF is $I_{WL}$, maximum modulation amplitude is $I_{WH}$ and modulation amplitude during tracking ON is $I_{WM}$:

$$0.05 < I_{WL}/I_0 < 0.1 \quad (13)$$

$$0.15 < I_{WH}/I_0 < 0.4 \quad (14)$$

$$0.1 < I_{WM}/I_0 < 0.3 \quad (15)$$

From Expressions (13) and (14), it was understood that a favorable tracking error signal was obtained. From the fact that the servo pit arrangement of the optical recording medium satisfied the condition of Expressions (6) to (8), it was confirmed that almost no tracking offset occurred while securing a sufficient degree of modulation even when the optical medium substrate was tilted by 0.5 degree. Especially, Expression (13) is a degree of modulation that can be obtained even if the light beam passed through the middle between wobble pits, and therefore it was confirmed that it was possible to detect the direction of movement of the light beam for the medium using variations in the arrangement of the first wobble pits even during access of an optical pickup. Use of the pit shape according to Expressions (1) and (2) seemed to have a great contribution. Moreover, the level of seek noise during access caused no problem.

Then, with regard to the address signal 215, since the servo pit arrangement of the optical recording medium satisfies Expressions (4) and (9), it was possible to set the maximum value 217 of the normalized sum signal between the address pit and the groove start to 90% or more of $I_0$ while securing a sufficient degree of modulation. This allowed symmetry between the groove end signal 211 and groove start signal 215 to improve, which showed that it was possible to reliably detect the end and start of the groove using a simple circuit.

(Embodiment 3)

This embodiment has the groove structure and wobble pit structure described in Embodiment 1 and Embodiment 2 and applies a distributed address format to the optimized arrangement of the respective servo pits.

Figure 14:
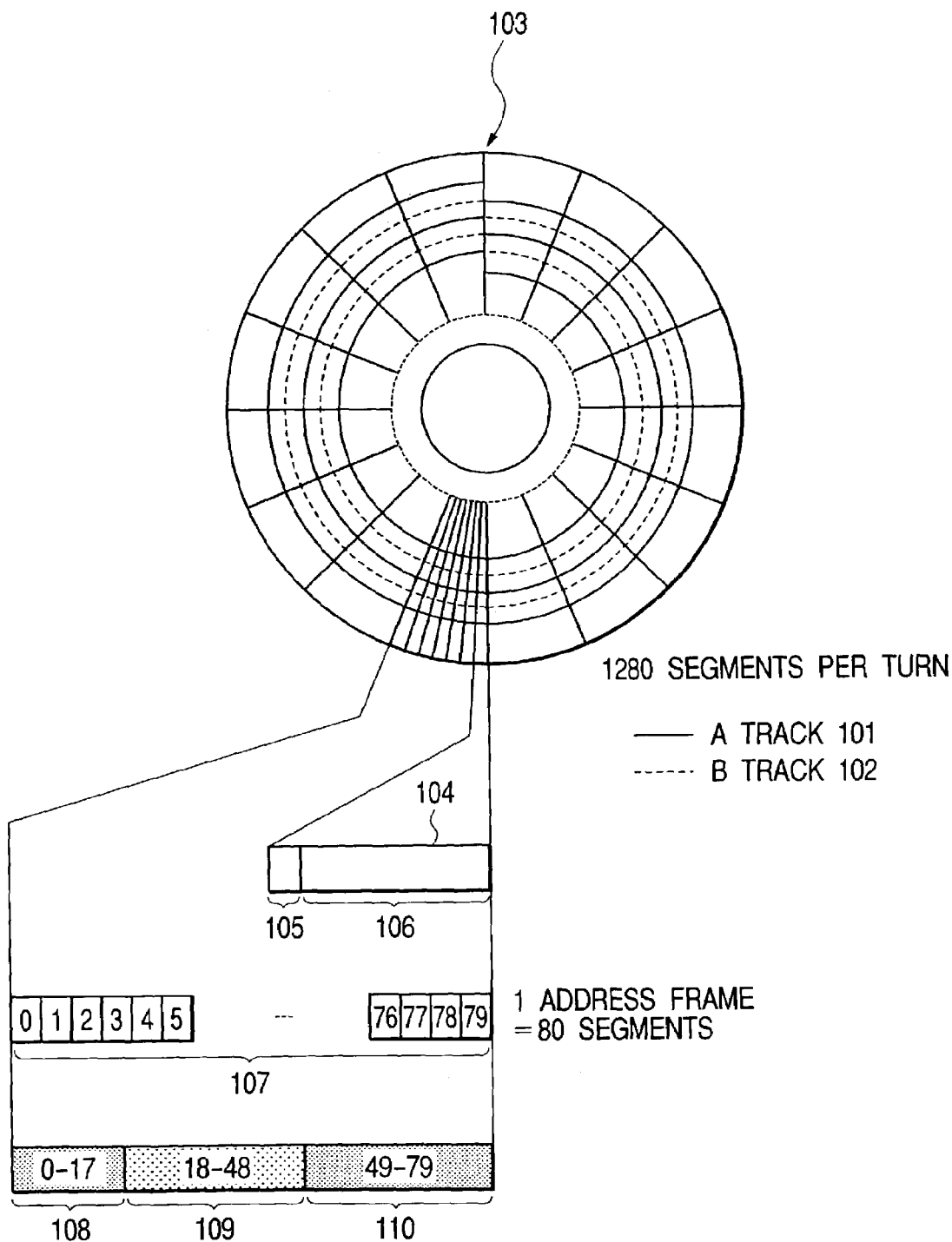
FIG. 14 is a plan view showing a configuration of an optical recording medium according to a third embodiment of the present invention.

An address format according to this embodiment will be explained using FIG. 14. In FIG. 14, the track structure of the optical recording medium is the same as that shown in FIG. 1. That is, it is constructed of track A 101 and track B 102 with mutually different servo polarities and it adopts a spiral structure in which track A and track B alternate every one turn of the medium. Track A and track B are connected at an AB track connection section 103. Furthermore, a track is divided into 1280 segments 104 per one turn of the medium and one segment 104 consists of a servo area 105 having servo pits and a data area 106 for recording desired data.

This embodiment places one address pit 205 at each segment and forms one address frame 107 of 80 segments (e.g., segments No. 0 to 79). That is, one turn of a track of the optical recording medium consists of 16 (Nos. 1 to 16) address frames as shown in FIG. 14.

A breakdown of each address frame is shown below. Eighteen segments from No. 0 to 17 record information on the track direction, that is, an address frame number (first). If an address frame number can be detected, the segment number resulting from a division of the address frame is easily found at the same time, and therefore it is called a "segment lock field" 108. The next 31 segments from Nos. 18 to 48 record information on the radial direction, that is, the numbers of track A, and therefore it is called a "track A address field" 109. The next 31 segments from Nos. 49 to 79 likewise record the numbers of track B, and therefore it is called a "rack B address field" 100. This procedure is repeated 16 times and segments Nos. 0 to 1279 are assigned to each area of 16 address frames.

Figure 15:
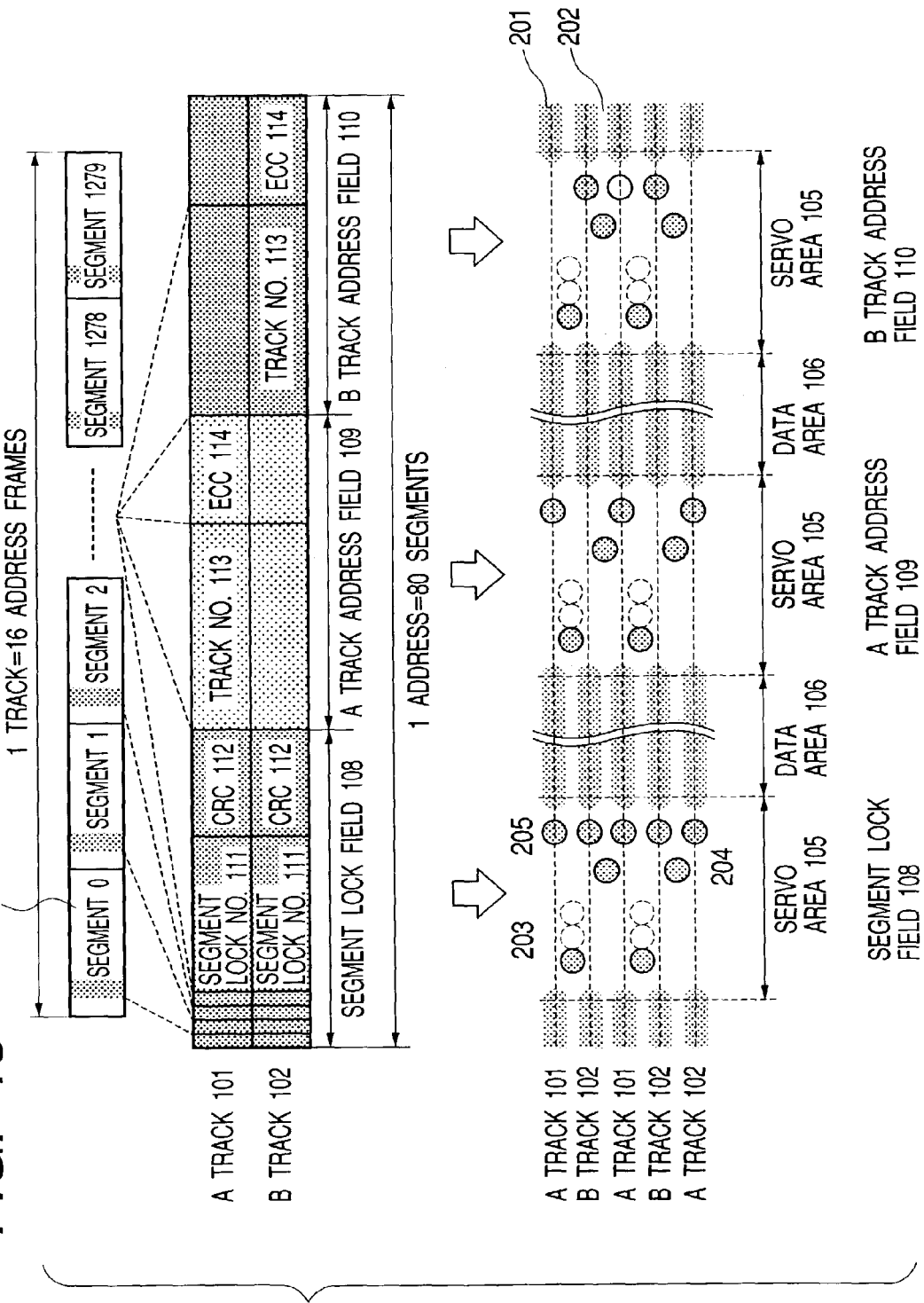
FIG. 15 is an illustration for a track configuration and address configuration of the optical recording medium according to the third embodiment of the present invention.

These segment lock field 108, track A address field 109 and track B address field 110 are further arranged in pairs of the neighboring track A 101 and track B 102 as shown in FIG. 15.

First, the segment lock field 108 records information common to the neighboring tracks A and B. The first half thereof is 7-bit segment lock number 111, and the second half thereof 11 bits error detection code CRC (Cyclic Redundancy check) 112. One feature of this address format is that CRC is added to a segment lock number which is information common between neighboring tracks. Furthermore, the segment lock field 108 records the same information on tracks A and B, and therefore information can be reproduced irrespective of ON/OFF of tracking.

The next track A address field 109 records a track A number only in track A, while track B is left blank to prevent interference from the neighboring pits. The first half of the track A address field 109 is a 16-bit track number 113 and the last half is a 15-bit Error Correction Code (ECC) 114.

The last track B address field 110 records a track B number only in track B, while track A is left blank to prevent interference from the neighboring pits. The first half of the track B address field 110 is likewise a 16-bit track number 113 and the last half is 15-bit Error Correction Code (ECC) 114.

With reference to the above-described configuration, recording and reproduction using the sampled servo system optical recording medium according to this embodiment will be explained in order of tracking pull-in and reproduction of address information.

First, tracking pull-in will be explained. As shown in FIGS. 14 and 15, track A 101 and track B 102 alternate every one turn of the medium forming a continuous track in a spiral form. Between track A and track B, the positions of the wobble pits 203 and 204 have a mirror-image relationship, whereby tracking servo polarities are reversed. Thus, using positions of two polarities, positive and negative, of a tracking signal can realize a double-density track pitch, but servo polarity needs to be switched at track AB connection section 103 for every turn of the medium. A conventional optical recording medium adopting this type of servo system places a special polarity inversion detection pit at the connection section 103 to invert servo polarity, but this embodiment does not require such a pit.

As shown in FIG. 15, the segment lock field 108 records the same information on all neighboring tracks in the radial direction of the medium. Therefore, the information in this field can be read irrespective of tracking ON/OFF.

Likewise, since the groove end signal 211 and groove start signal 215 are also arranged in the track direction between neighboring tracks, they can be detected stably irrespective of tracking ON/OFF. Furthermore, since the groove start and end signals of this embodiment are obtained as a downward convex signal as if pits are arranged at the edge of the groove, the signal can be easily detected using a simple circuit as shown in FIG. 6.

When the groove end signal 211 and groove start signal 215 can be detected as stated above, the positions of the first wobble pit 203, second wobble pit 204 and address pit 205 placed there between are known beforehand, and therefore they can be easily detected. A tracking error signal is generated from the difference in the sampling values of the first wobble pit 203 and second wobble pit 204. Then, in the segment lock area 108, the address pit 205 that corresponds to the segment lock number 111 and CRC code 112 can also be detected.

With regard to demodulation of segment lock numbers, a technique similar to that disclosed in International Patent Application WO 00/45382 can be used. That is, it is possible to use a simple address demodulator (not shown) made up of a shift register (not shown) capable of storing segment lock number 111 and CRC code 112 and CRC error detector (not shown), etc. Since an address pit 205 is placed for every segment, every time an address pit of a segment lock field is detected, it is possible to sequentially store the address pits in a shift register and complete error detection while the next address pit is detected. No CRC error occurs only when all segment lock number 111 and CRC code 112 are correctly loaded into the shift register. For example, a CRC error becomes 0 when the 17th segment is read, and at the same time it is the first address frame and consequently it is discovered to be the 17th segment. In the same way, the CRC error becomes 0 when the 97th, 177th, . . . , 1137th, 1217th segments are read and at the same time it is discovered to be the second, third, . . . 15th, and 16th frames. Thus, it is possible to demodulate a segment lock number at the timing of making the CRC error detector zero, detect an address frame number, and at the same time know the segment number. Then, to control the segment numbers thereafter, it is possible to add "1" to the segment number that could be detected every time a groove end signal is detected.

Based on this, it is possible to know the AB track connection section 103 located in a predetermined position (e.g., between the 16th and first address frames) and switch servo polarities. Since there are 16 chances to know the address frame number and segment number for every turn of the medium, it is possible to realize quick tracking pull-in. Furthermore, the AB track connection section 103 can be known beforehand, it is possible to realize stable tracking pull-in compared to a conventional example which operates after a polarity inversion detection pit is detected.

In addition, since the position where no CRC error will occur is univocally determined, it is possible to synchronize address information without any special address mark, etc. No polarity inversion detection pit is required, either.

Next, reproduction of address information will be explained. As stated above, when tracking pull-in is achieved, address pits 205 in the track A address area 109 and track B address area can be detected. Moreover, these information pieces can be reproduced using the same method as that for the segment lock field 108. That is, it is possible to use another shift register (not shown) capable of storing track A or B number 113 and ECC (Error Correction Code) 114 and ECC error detector (not shown) added to the aforementioned modulator.

By means of an error-free timing signal from the CRC error detector, it is possible to operate a shift register for saving the track number 113 and ECC 114, and the ECC error detector and allow a track number detector (not shown) to demodulate a track number. For example, the track number of track A and ECC can be sent from the shift register to the ECC error detector after 31 segments (segment number 48) after the CRC error becomes 0 (e.g., segment number 17). The track number of track B and ECC can be sent to the ECC error detector after 62 segments (segment number 79) after the CRC error becomes 0. The track number sent is subjected to error detection and the track number detector detects the track number.

It is possible to quickly detect the track number 113 within one address frame after the CRC error detector carries out synchronous detection. Furthermore, since address information is distributed on every one bit of the optical recording medium, even if there is a finger print or scratch on the surface of the medium substrate, the probability that burst errors will occur is extremely low. This is because burst errors on the conventional optical recording medium correspond to random errors in the optical recording medium according to this embodiment and ECC functions effectively.

Furthermore, by arranging address pits 205 so that one address pit is distributed in each segment, the sampled servo system optical recording medium of this embodiment becomes a uniform structure in which all segments 104 have the same servo area 105 and the data area (having different capacities depending on the radial position). Therefore, it is possible to easily start recording a predetermined amount of data (e.g., 32 k bytes) from an arbitrary segment and stop recording at another arbitrary different segment. Furthermore, it is possible to freely change the amount of data recorded for each segment. Making the most of the flexibility in the format of this optical recording medium will improve the performance of a recording medium in the future, and the same physical format can also be used when higher recording density is available.

When a distributed address format was applied to the optical recording medium in the configurations of Embodiments 1 and 2, it was possible to detect the groove start and end signals using an inexpensive detection circuit irrespective of the sampled servo system in which the length of the servo area is fixed, independently of the position in the radial direction, thereby allowing quick, stable clock detection and tracking pull-in. Thus, compared to the optical recording medium according to the conventional example shown in FIG. 21 and FIG. 22, etc., this embodiment was able to detect the end and start of the groove with high accuracy and confirmed the ability to drastically improve address read errors.

Furthermore, to improve the format efficiency, the optical recording medium of the present invention has wobble pits also functioning as clock pits simultaneously and proved the ability to realize quick, stable clock detection and tracking pull-in by utilizing the groove start and end signals even when using an MCLV-based recording/reproduction method which has difficulty in clock detection. Thus, this embodiment confirmed its ability to reliably detect the groove end and groove start and improve address read errors while eliminating clock pits which have been required by the conventional example such as the one disclosed in International Patent Application WO 00/45382, etc.

(Embodiment 4)

This embodiment will describe a magneto-optical recording medium having the groove structure and wobble pit structure described in Embodiments 1 and 2 and having a magneto-optical film according to a domain wall displacement detection system as disclosed in Japanese Patent Application Laid-Open No. 6-290496 formed on a substrate with optimized servo pit arrangement.

Figure 16:
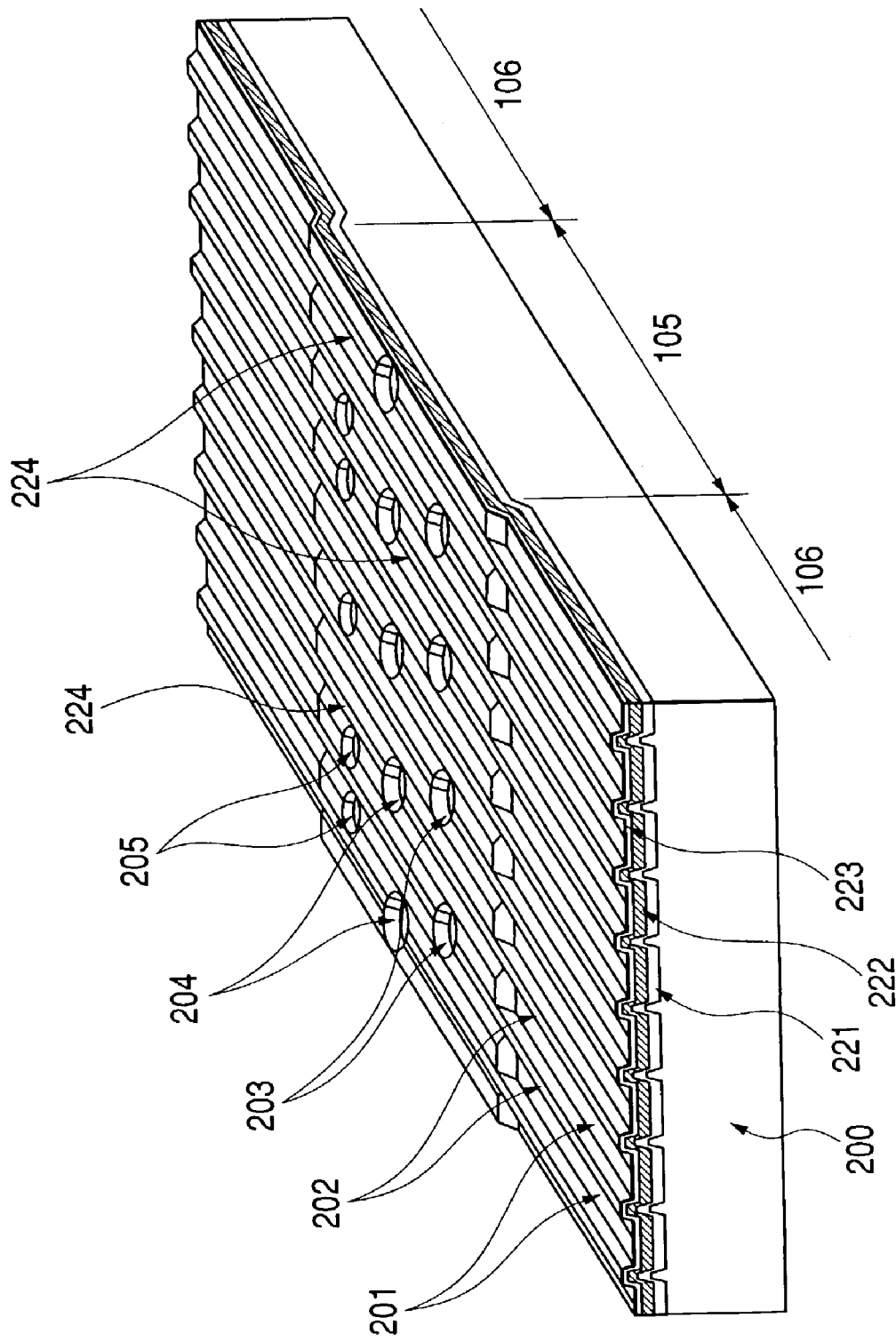
FIG. 16 is a perspective view showing a configuration of an optical recording medium according to a fourth embodiment of the present invention.
Figure 17:
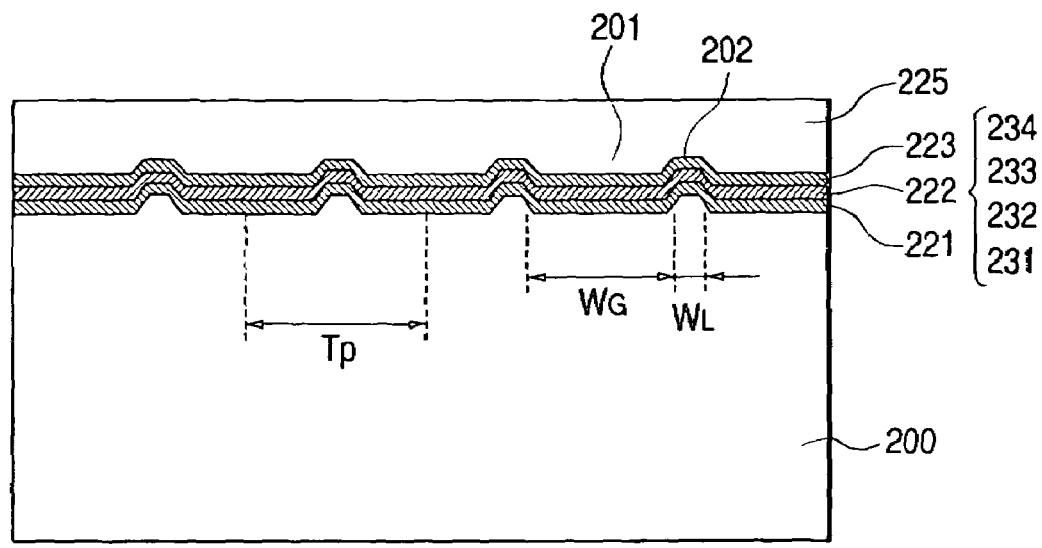
FIG. 17 is a sectional view showing a configuration of the optical recording medium according to the fourth embodiment of the present invention.

Details of the boundary section of the respective segments 104 will be shown together with a sectional structure of a disk in FIG. 16. Furthermore, FIG. 17 shows a sectional view in the radial direction of the magneto-optical recording medium in the data area 106. This embodiment has servo pits and grooves 201 embossed on a polycarbonate substrate 200 of 0.6 mm in thickness.

A first dielectric layer 221 of silicon nitride, a magnetic layer 222 and a second dielectric layer 223 of silicon nitride are formed on the substrate 200. On top of this, as shown in FIG. 17, a protective layer, lubrication layer, etc., 225 are provided as required. As shown in FIG. 17, the magnetic layer 222 is constructed of four magnetic layers of a magnetic domain wall displacement layer 231, a switching layer 232, a control layer 233 and a recording layer 234. The configuration of these layers is the same as that disclosed in Japanese Patent Application Laid-Open No. 11-134730 and is adapted to a DWDD reproduction system.

The optical disk in this configuration is produced using the following procedures. On a molded polycarbonate substrate, a silicon nitride layer, magnetic domain wall displacement layer, switching layer, control layer, recording layer and silicon nitride layer are formed in that order, and then a process of breaking magnetic coupling of lands 202 which separate the grooves 201 constituting a recording track, is carried out.

In FIG. 16, the servo area 105 is provided with first wobble pits 203, second wobble pits 204 and address pits 205 as in the case of Embodiments 1 and 2. Clock extraction for recording/reproduction is achieved by detecting the positions of the second wobble pits or the groove start and end and synchronizing with the clock. Thus, there is no need to provide special clock pits. Placing only minimum necessary servo pits makes it possible to keep the length of the servo area 105 in the track direction, that is, the length of interruption of a groove (or land) to approximately 5.5 μm throughout the entire magneto-optical recording medium. Since the recording liner density of a DWDD medium is five times as high as the linear recording density of servo pits whereby, shortening the servo area as stated above is very important in improving the format efficiency.

According to this embodiment, when cutting the magnetic coupling between tracks, the lands 202 are scanned with a fine light spot generated by a laser with a wavelength λ=405 nm and an objective lens with NA=0.85, from the plane of the film (upward direction in FIG. 16) which is the plane on which the aforementioned grooves of the substrate 200 are formed, and the magnetic film is subjected to annealing treatment. The diameter (full width at half maximum) of this light spot is 280 nm. Through annealing treatment, perpendicular anisotropic magnetic energy of the magnetic film reduces and the magnetization easy axis changes from the direction perpendicular to the plane of the film to the in-plane direction due to influences of a demagnetizing field. Therefore, the magnetic bond as a vertically magnetized film is interrupted, which prevents any boundary (magnetic domain wall) between magnetic domains in a vertically magnetized film from existing. As shown in FIG. 16, the magnetic bond interruption areas 224 pass above lands in the data area 106 and above wobble pits of the servo area. This annealing treatment can improve the performance of the DWDD medium drastically.

This scanning is carried out with tracking applied to the lands 202 using a push-pull method. If the length of interruption of the land is approximately 5.5 μm, light spots can pass through the servo area without any major detrack. Moreover, this length is constant throughout the entire area of the optical recording medium, and therefore annealing treatment can be conducted with a constantly stable tracking operation. That is, it is possible to obtain a magneto-optical medium having a good DWDD characteristic throughout the entire area of the optical recording medium.

The magneto-optical recording medium of this embodiment is constructed in such a way that recording and reproduction of the medium is performed using a semiconductor laser having a wavelength λ=660 nm and an objective lens of NA=0.6, and a light beam is introduced from a plane opposite to the plane on which the grooves of the substrate 200 are formed through the substrate 200 (from downward direction in FIG. 16) to scan the information tracks. The full width at half maximum (FWHM) of the light spot is 570 nm. Grooves 201 are used as a track in which data is recorded and reproduced. The distance between the center lines of two grooves, that is, a track pitch (Tp) is 540 nm, a full width at half maximum ($W_G$) of the groove 201 is 440 nm, and a full width at half maximum ($W_L$) of the land 202 is 100 nm. Furthermore, the depth of the groove is 30 nm, but it preferably satisfies Expression (3)'. The angle of the groove slope is approximately 30 degrees.

Furthermore, the center distance $L_{G-W1}$ between the groove end and first wobble pit of this embodiment is 1.35 μm (2.37 FWHM) at the shortest and satisfies Expression (6). The shortest center distance $L_{W1-W1}$ between the first and second wobble pits is 1.18 μm (2.08 FWHM) and satisfies Expression (7). The center distance $L_{W2-A}$ between the second wobble pit and address pit is 1.35 μm (2.37 FWHM) and satisfies Expression (8). The center distance $L_{A-G}$ between the address pit and groove start is 1.01 μm (1.78 FWHM) and satisfies Expression (9).

The diameters at half maximum of the first and second wobble pits are track direction 400 nm×radius direction 570 nm, representing 0.70 FWHM×1.0 FWHM, respectively and satisfy Expressions (1) and (2). Furthermore, a space $L_s$ between the groove end and wobble pit is 1.15 μm (2.02 FWHM) and satisfies Expression (4). The diameter at half maximum of the address pit is 360 nm, the space Ls between the address pit and groove start is 0.83 μm (1.46 FWHM) and satisfies Expression (4).

As set out above, by adopting oval-shaped wobble pits which are longer in the radial direction, the medium according to this embodiment could obtain a sufficient modulation signal even if a light spot is located between wobble pits in the radial direction. Furthermore, by optimizing the arrangement of the groove start and end and each servo pit, this embodiment could suppress a tracking signal offset to a sufficiently small level even if the magnet-optical medium is tilted in the radial direction. Furthermore, this embodiment could obtain a groove end signal and groove start signal with a sufficiently downward convex modulation degree.

Moreover, this embodiment could keep the length of the servo area to approximately 5.5 μm throughout the entire opto-magnetic medium, and could thereby suppress the degree of redundancy of the servo area to approximately 6%.

Furthermore, this embodiment could also perform stable annealing treatment throughout the entire magneto-optical medium.

As explained above, the optical recording medium of the present invention allows stable detection of the groove start and end signals irrespective of before or after tracking pull-in. Moreover, the groove start and end signals are obtained as a downward convex signal as if pits are arranged at the groove edge, and it is therefore possible to easily detect the groove start and end positions when 0 cross is detected using a differential circuit. Therefore, even in the sampled servo system with the fixed length of the servo area irrespective of the position in the radial direction, it is possible to detect groove start and end signals using a stable and inexpensive detection circuit and provide quick, stable clock detection and tracking pull-in.

Furthermore, use of the optical recording medium of the present invention can realize quick, stable clock detection and tracking pull-in using a stable and inexpensive detection circuit according to an MCLV-system recording/reproduction method while using wobble pits functioning also as clock pits to improve the format efficiency.

Especially when the present invention is applied to a domain-wall-displacement-detection-type magneto-optical recording medium, the present invention not only is extremely effective in improving the format efficiency but also can provide stable annealing treatment, and can thereby increase the recording capacity drastically.

What is claimed is:

1. An optical recording medium for reproducing information using a light beam, comprising:
    a disk-shaped transparent substrate;
    servo areas and data areas formed on said substrate; and pits formed on said servo areas,
    wherein said servo areas are formed on flat sections of said substrate, said data areas are formed in grooves of said substrate, said servo areas and data areas are provided alternately in the circumferential direction of said substrate to thereby form information tracks,
    wherein a depth $D_G$ of said grooves satisfies an expression of $D_G(\lambda/N) < 0.16$, where $\lambda$ is a wavelength of the light beam and N is an index of refraction of said substrate,
    wherein a distance $L_s$ between an edge of said groove and a pit closest thereto satisfies an expression of $L_s > 1.2$ FWHM, where FWHM is a full width at half maximum of said light beam in the track direction, and
    wherein a track pitch Tp of said information track satisfies an expression of Tp<FWHM.

2. The optical recording medium according to claim 1, wherein first wobble pits, second wobble pits and at least one address pit are formed in that order in said servo areas, and wherein a center distance $L_{G-W1}$ between said groove edge and the first wobble pit and a center distance $L_{A-G}$ between said groove edge and said address pit satisfy an relation of $L_{G-W1} > L_{A-G} > 1.5$ FWHM, where FWHM is a full width at half maximum of said light beam in the track direction.

3. The optical recording medium according to claim 2, wherein a distance $L_{W1-W2}$ between the center of said first wobble pit and the center of said second wobble pit and a distance $L_{W2-A}$ between the center of said second wobble pit and the center of said address pit satisfies an expression of $$L_{W2-A} \text{ and } L_{G-W1} > L_{W1-W2} > L_{A-G}.$$

4. The optical recording medium according to claim 2, wherein a position of said first wobble pit is displaced in the track direction for every plurality of the tracks.

5. The optical recording medium according to claim 2, wherein a position of said second wobble pit in the track direction is fixed and said second wobble pit also functions as a clock pit.

6. The optical recording medium according to claim 2, wherein said $L_{G-W1}$ satisfies an expression of $L_{G-W1} > 2.3$ FWHM.

7. The optical recording medium according to claim 2, wherein said $L_{W1-W2}$ satisfies an expression of $L_{W1-W2} > 2$ FWHM.

8. The optical recording medium according to claim 2, wherein said $L_{W2-A}$ satisfies an expression of $L_{W2-A} > 2.3$ FWHM.

9. The optical recording medium according to claim 2, wherein a land section is formed between the grooves in a direction perpendicular to the track direction of said transparent substrate, and wherein said first wobble pits and said second wobble pits are placed alternately on an extension in the track direction of said lands.

10. The optical recording medium according to claim 1, wherein the depth $D^G$ of said groove satisfies an expression of $0.04 < D_G/(\lambda/N) < 0.13$.

11. The optical recording medium according to claim 1, wherein a ratio of a width $W_G$ of said groove to a track pitch Tp of said information track satisfies an expression of $0.74 < W_G/Tp$.

12. The optical recording medium according to claim 1, wherein said servo areas are arranged radially from the center of said disk-shaped substrate and have a fixed length in its circumferential direction.

13. The optical recording medium according to claim 1, wherein a distance $L_S$ between said groove edge and a pit closest thereto satisfies an expression of $L_S > 1.5$ FWHM.

14. The optical recording medium according to claim 1, wherein an area where no user data is recorded is provided in said data area within 1.5 FWHM from said groove edge.

* * * * *

UNITED STATES PATENT AND TRADEMARK OFFICE
CERTIFICATE OF CORRECTION

PATENT NO. : 7,167,436 B2
APPLICATION NO. : 10/437180
DATED : January 23, 2007
INVENTOR(S) : Osamu Koyama et al.

It is certified that error appears in the above-identified patent and that said Letters Patent is hereby corrected as shown below:

COLUMN 1:
Line 66, "do not" should read --does not--.

COLUMN 2:
Line 1, "radius" should read --radial--.
Line 10, "high-degree" should read --high degree--.
Line 30, "acter 0" should read --acter O--.
Line 31, "denote" should read --denotes--.
Line 37, "radius" should read --radial--.
Line 49, "of on" should read --on--.
Line 62, "radius" should read --radial--.

COLUMN 3:
Line 26, "WO2/23543" should read --WO 02/23543--.
Line 34, "radius" should read --radial--.
Line 64, "radius" should read --radial--.

COLUMN 7:
Expression 2, "0.8 0FWHM<Lr<1.1 FWHM" should read
--0.8 FWHM<Lr<1.1 FWHM--.

COLUMN 11:
Line 17, "the case" should read --The case--.

COLUMN 12:
Line 10, "the-width" should read --the width--.

COLUMN 16:
Line 32, "(9)" should read --(9)'--.
Line 46, "(11)" should read --(10)--.

COLUMN 18:
Line 31, "check)" should read --Check)--.

UNITED STATES PATENT AND TRADEMARK OFFICE
CERTIFICATE OF CORRECTION

PATENT NO. : 7,167,436 B2
APPLICATION NO. : 10/437180
DATED : January 23, 2007
INVENTOR(S) : Osamu Koyama et al.

It is certified that error appears in the above-identified patent and that said Letters Patent is hereby corrected as shown below:

COLUMN 19:
Line 55, "Furthermore," should read --Furthermore, since--.

COLUMN 22:
Line 37, "$L_{W1-W1}$" should read --$L_{W1-W2}$--.
Line 45, "nm×radius" should read --nm×radial--.
Line 60, "magnet-optical" should read --magneto-optical--.

COLUMN 24:
Line 1, "an relation" should read --a relation--.
Line 35, "depth $D^G$" should read --depth $D_G$--.

Signed and Sealed this

Seventh Day of April, 2009

JOHN DOLL
*Acting Director of the United States Patent and Trademark Office*